(12) United States Patent
Lee et al.

(10) Patent No.: US 7,990,490 B2
(45) Date of Patent: Aug. 2, 2011

(54) OPTICAL SHEET AND DISPLAY DEVICE HAVING THE SAME

(75) Inventors: Sang-Hoon Lee, Cheonan-si (KR); Byung-Yun Joo, Seoul (KR); Min-Young Song, Seoul (KR); Jin-Sung Choi, Cheonan-si (KR); Seung-Hwan Chung, Seongnam-si (KR); Dong-Kwan Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 321 days.

(21) Appl. No.: 12/315,808

(22) Filed: Dec. 4, 2008

(65) Prior Publication Data
US 2009/0167983 A1 Jul. 2, 2009

(30) Foreign Application Priority Data
Dec. 31, 2007 (KR) .................. 10-2007-0141501

(51) Int. Cl.
  *G02F 1/1335* (2006.01)
  *G02B 5/02* (2006.01)
  *F21V 5/04* (2006.01)
  *F21V 7/04* (2006.01)
(52) U.S. Cl. ........... 349/62; 359/599; 362/327; 362/606
(58) Field of Classification Search ................. 362/327, 362/606, 607; 349/62; 359/599
See application file for complete search history.

(56) References Cited

U.S. PATENT DOCUMENTS

| | | | |
|---|---|---|---|
| 2001/0012078 A1* | 8/2001 | Hira et al. ..................... 349/95 |
| 2005/0007513 A1 | 1/2005 | Lee et al. | |
| 2005/0024554 A1 | 2/2005 | Lee et al. | |
| 2006/0285312 A1 | 12/2006 | Ogawa et al. | |
| 2007/0076406 A1* | 4/2007 | Kodama et al. ............. 362/97 |
| 2008/0192484 A1* | 8/2008 | Lee et al. .................... 362/327 |
| 2008/0239202 A1* | 10/2008 | Won et al. ................... 349/64 |
| 2009/0128914 A1* | 5/2009 | Lee et al. .................... 359/599 |
| 2009/0323313 A1* | 12/2009 | Choi et al. .................. 362/97.2 |

(Continued)

FOREIGN PATENT DOCUMENTS

| | | |
|---|---|---|
| EP | 0372525 A2 | 6/1990 |
| JP | 2000-284268 A | 10/2000 |

(Continued)

OTHER PUBLICATIONS

Machine Translation of claims, description and abstract for JP2000-284268A, Oct. 2000.*

(Continued)

*Primary Examiner* — Michelle R Connelly Cushwa
(74) *Attorney, Agent, or Firm* — Innovation Counsel LLP

(57) ABSTRACT

An optical sheet includes a base layer, a light-condensing layer and a plurality of light-reflecting portions. The base layer includes a first surface and a second surface. The light-condensing layer includes a plurality of light-condensing portions with a first pitch. The light-condensing portions are formed along a first direction of the second surface. The light-reflecting portions are formed in the first surface to be spaced apart from each other along the -first direction in correspondence with a plurality of grooves, each groove formed between two light-condensing portions. An interval distance between a center of the light-condensing portion and an edge of the light-reflecting portion increases when moving toward the edge of the first surface from a center of the first surface along the first direction. Therefore, the number of the optical sheets used for the display device may be reduced.

19 Claims, 15 Drawing Sheets
(3 of 15 Drawing Sheet(s) Filed in Color)

U.S. PATENT DOCUMENTS

2010/0061096 A1 * 3/2010 Sato .............................. 362/235

FOREIGN PATENT DOCUMENTS

| | | | |
|---|---|---|---|
| JP | 2000284268 A | * | 10/2000 |
| JP | 2006-309002 | | 11/2006 |
| JP | 2007-0003124 | | 1/2007 |
| JP | 2007-003908 | | 1/2007 |

OTHER PUBLICATIONS

EP Search Report, EP 08021486.9-2205, Mar. 29, 2010, 9 pages.
EP Search Report, EP 08021983.5-2205, Mar. 29, 2010, 9 pages.

* cited by examiner

OPTICAL SHEET AND DISPLAY DEVICE HAVING THE SAME

CROSS-REFERENCE TO RELATED APPLICATIONS

This application claims priority under 35 U.S.C. §119 to Korean Patent Application No. 2007-141501, filed on Dec. 31, 2007 in the Korean Intellectual Property Office (KIPO), the contents of which are herein incorporated by reference in their entirety.

BACKGROUND OF THE INVENTION

1. Field of the Invention

The present invention relates to an optical sheet and a display device having the optical sheet. More particularly, the present invention relates to an optical sheet capable of diffusing and condensing light, and a display device having the optical sheet.

2. Description of the Related Art

Generally, a liquid crystal display (LCD) is a non-emissive type display device, so that the LCD device necessarily requires a light source such as a backlight device to supply a backside of an LCD panel of the LCD device with light.

The backlight assembly may be classified as either an edge illumination type backlight assembly or a direct illumination type backlight assembly. In the case of the edge illumination type backlight assembly, a light source such as cold cathode fluorescent lamps (CCFL) are disposed adjacent to a side edge surface of a light-guide plate (LGP). In the case of the direct illumination type backlight assembly, a plurality of light sources is disposed at a rear surface of the LCD panel.

The backlight assembly includes a plurality of optical sheets that enhance optical characteristics of light exiting from the light source. The optical sheet may include a diffusion sheet which diffuses light, a prism sheet which condenses the diffused light toward a front direction, a protective sheet which protects the prism sheet, etc.

In order to improve luminance uniformity and general luminance levels, additional diffusion sheets, prism sheets, and/or reflective polarizing sheets, etc., may be used in the display device. However, the additional sheets may cause a cost increase for manufacturing the backlight assembly. It is desirable to improve luminance without additional costs due to the extra sheets. In order to decrease the number of optical sheets, when the diffusion sheet and the prism sheet are replaced with one optical sheet, the one optical sheet should have both functions of the diffusion sheet and the prism sheet.

Moreover, the one optical sheet should not decrease display quality, as may be the case with multiple optical sheets. Particularly, the one optical sheet should satisfy certain visibility conditions, such as luminance and contrast ratio characteristics of the display screen, TCO'03 conditions, etc. For example, a TCO'03 condition may represent a required condition in which a luminance ratio should be no more than 1.7 at two edges of the display panel when the luminance of the edges of the display panel is observed from a predetermined viewing angle. (TCO stems from the Swedish language and stands for "Tjänstemännens Centralorganisation," and the English translation is the "Swedish Confederation of Professional Employees.")

As described above, there are various technologies that include using one optical sheet having multiple functions. For example, the multifunction optical sheet includes a transparent film, a plurality of prism patterns or a plurality of lenses formed on an upper surface of the transparent film and a plurality of diffusion beads formed under a lower surface of the transparent film. For another example, the multifunction optical sheet includes a plurality of transparent layers having different refractive indices. For still another example, the multifunction optical sheet includes a light-diffusion layer having an air bubble formed therein.

However, the multifunction optical sheet developed in accordance with conventional technology may not fully satisfy required display conditions that are achieved by a plurality of optical sheets. Particularly, the conventional multifunction optical sheet may not include a structure for satisfying visibility conditions of a display panel, such as the TCP'03 conditions.

Thus, an optical sheet having multiple functions capable of replacing optical sheets used for a display device is required to be developed, which satisfies display quality conditions, such as luminance, contrast ratio and TCO'03 conditions that are required by the display device.

SUMMARY OF THE INVENTION

The present invention provides an optical sheet which satisfies optical characteristics required in a display device by using one optical sheet.

The present invention also provides a display device having the above-mentioned optical sheet.

In one aspect of the present invention, an optical sheet includes a base layer, a light-condensing layer and a plurality of light-reflecting portions. The base layer includes a first surface and a second surface facing the first surface. The light-condensing layer includes a plurality of light-condensing portions with a first pitch. The light-condensing portions are formed along a first direction of the second surface. The light-reflecting portions are formed in the first surface to be spaced apart from each other along the first direction in correspondence with a plurality of grooves in which the light-condensing portions are met with each other. An interval distance between a center of the light-condensing portion and an edge of the light-reflecting portion is increased with moving toward the edge of the first surface from a center of the first surface along the first direction.

In one embodiment, centers of the light-reflecting portions corresponding to a groove may be substantially equal to each other in a center of the base layer, and the light-reflecting portions may have a uniform first line width to be formed in a second pitch that is greater than the first pitch along the first direction from the center of the base layer.

For one example, the light-condensing portions are extended along a second direction perpendicular to the first direction to form a light-condensing stripe pattern. A cross-section of the light-condensing portion, which is cut in parallel with the first direction, may be protruded toward a normal line of the second surface. The light-reflecting portions may be extended along the grooves that are formed in parallel with the second direction to form a light-reflecting stripe pattern.

For another example, each of the light-reflecting portions may include a first partition part and a second partition part. The first partition part may have a first line width. The first partition part may be formed along the first direction from the center with the second pitch. The second partition part may have a second line width. The second partition part may be formed along the second direction from the center with a third pitch. The first and second partition parts may define a matrix shape.

For still another example, each of the light-condensing portions may have a convex lens shape that is protruded from the second surface to be arranged along a second direction perpendicular to the first direction with the first pitch.

In one embodiment, the light-condensing portions may be extended along a second direction perpendicular to the first direction to form a light-condensing stripe pattern, and a center of the light-reflecting portion may be disposed in the groove parallel with the second direction to form a reflecting stripe pattern. Here, a line width of the light-reflecting portion is decreased with moving toward the edge of the optical sheet from the center of the optical sheet along the first direction. The first pitch is defined as a distance between the grooves adjacent to each other, and the incident area is defined as an opening portion exposing a first surface between adjacent light-reflecting portions. An aperture ratio is defined by a ratio of widths of the incident area for the first pitch defined by a distance between adjacent grooves satisfies the equation of $(0.5\times DR+0.3)<AR<(0.5\times DR+0.70)$ (wherein, 'DR' represents a ratio of a distance between a center of a length of the optical sheet and a center of the corresponsive light incident area, and 'AR' represents an aperture ratio.)

In one embodiment, the light-condensing portions may be extended along a second direction crossing the first direction with a positive acute angle to form a light-condensing stripe pattern, and the light-reflecting portions may be extended along a third direction crossing the second direction with a negative acute angle to form a light-condensing stripe pattern. Here, each center of the light-reflecting portions may be substantially corresponding to each of the grooves which are formed by the adjacent light-condensing portions at the edge portions.

In one embodiment, a convex-concave pattern layer may be disposed between the first surface and the light-reflecting portion to have a protruding portion pattern having the light-reflecting portions formed thereon. At least one of the light-condensing layer and the convex-concave pattern layer may include a light dispersant.

In another aspect of the present invention, a display device includes a light-guide plate (LGP), a light source, an optical sheet, and a display panel. The LGP has a light-exiting surface, a light-reflecting surface opposite to the light-exiting surface and a plurality of side surfaces connecting to the light-exiting surface and the light-reflecting surface. The light source is disposed at least one of the side surfaces to provide the side surface with light. The optical sheet comprises a base layer, a light-condensing layer and a plurality of light-reflecting portions. The base layer includes a first surface facing the light-exiting surface and a second surface opposite to the first surface. The light-condensing layer includes a plurality of light-condensing portions formed on the second surface with a first pitch. The light-condensing portions are formed along a first direction of the second surface. The light-reflecting portions are formed on the first surface to be spaced apart from each other along the first direction in correspondence with a plurality of grooves in which the light-condensing portions are met with each other. Here, an interval distance between a center of the light condensing portion and an edge of the light-reflecting portion is increased with moving toward the side surface where the light source is disposed on another surface opposite to the side surface. The display panel is disposed on the optical sheet to display image based on the light exiting through the light-condensing layer.

In one embodiment, centers of the light-reflecting portions corresponding to a groove may be substantially equal to each other in a center of the base layer, and the light-reflecting portions may have a uniform first line width to be formed in a second pitch that is greater than the first pitch along the first direction from the center of the base layer.

In one embodiment, each center of the light-reflecting portions in correspondence with each the grooves substantially corresponds to each other, and each line widths of the light-reflecting portions decreased with moving toward the side surface where the light source is disposed on another surface opposite to the side surface along the first direction.

In one embodiment, the light-condensing portions may be extended along a positive acute angle to form a light-condensing stripe pattern. The light-reflecting portions may be extended along a negative acute angle to form a light-reflecting stripe pattern. The light-condensing stripe pattern and the light-reflecting stripe pattern may be arranged to be crossed with an arrangement pattern of pixels of the display panel to prevent a moiré phenomenon from occurring on the display panel.

In one embodiment, the optical sheet may be only one disposed between the LGP and the display panel to enhance luminance uniformity and a front luminance of light exiting through the light-exiting surface. Here, a plurality of light-diffusion patterns may be formed on the light-reflecting surface, so that the light-diffusion patterns reflect and diffuse a portion of light incident through the side surface.

According to an optical sheet and a display device having the optical sheet, a display device includes one optical sheet according to the present invention, so that a plurality of optical sheets such as a diffusion sheet and a light-condensing sheet may be omitted. The optical sheet is disposed on an LGP to enhance optical characteristics of light exiting from the LGP. The optical sheet may satisfy viewing angle characteristics such as front luminance and contrast ratio characteristics and TCO conditions. Therefore, display quality may not be decreased, and the number of the optical sheets that are used for the display device may be reduced.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

The above and other advantages of the present invention will become readily apparent by reference to the following detailed description when considered in conjunction with the accompanying drawings wherein.

DESCRIPTION OF THE EMBODIMENTS

Figure 1:
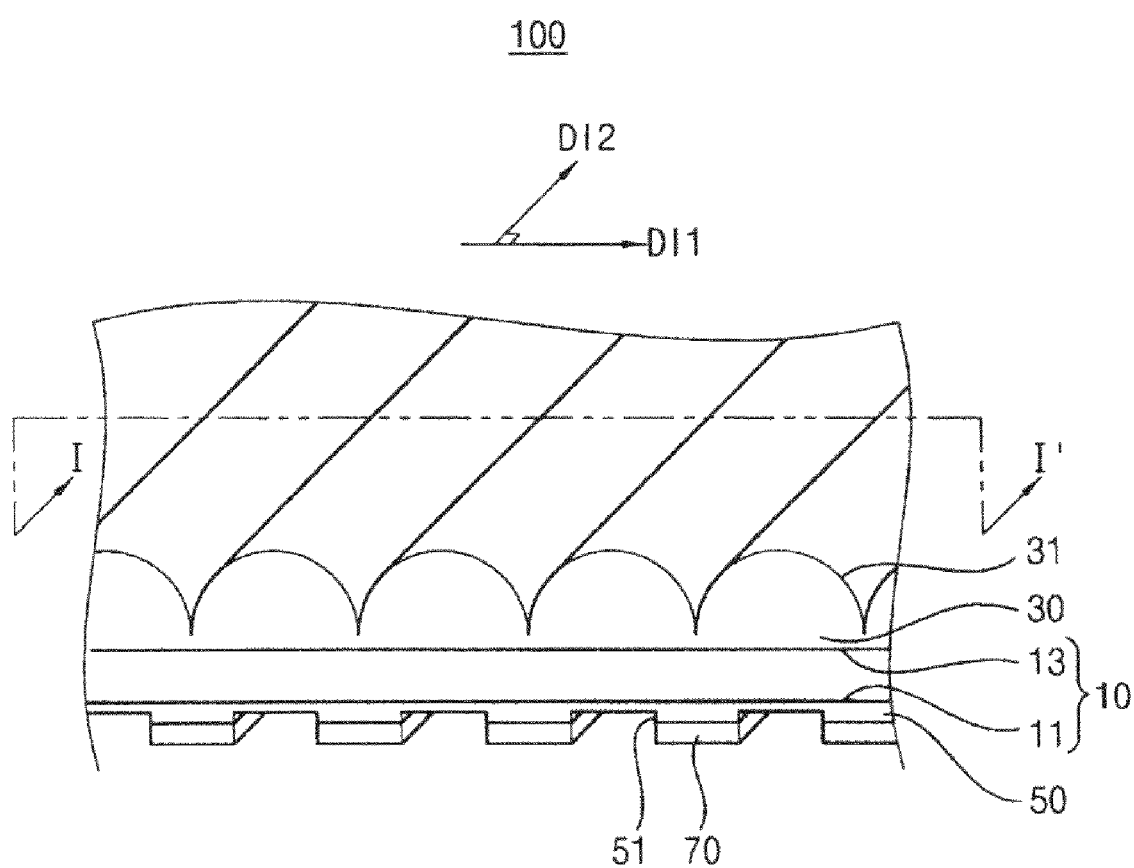
FIG. 1 is a perspective view illustrating part of an optical sheet according to a first embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (or intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Optical Sheet

Figure 2:
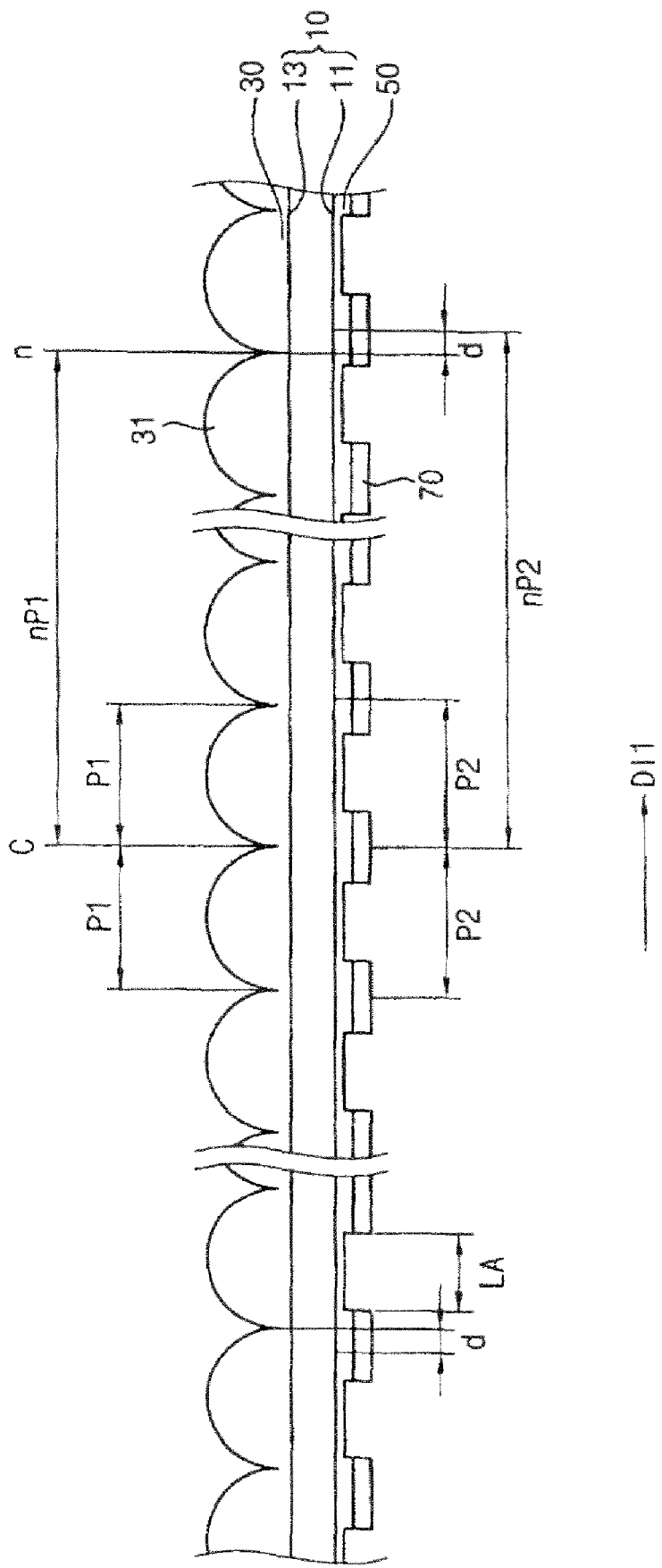
FIG. 2 is a cross-sectional view taken along a line I-I' of FIG. 1.

FIG. 1 is a perspective view illustrating part of an optical sheet according to a first embodiment of the present invention. FIG. 2 is a cross-sectional view taken along a line I-I' of FIG. 1.

Referring to FIG. 1, an optical sheet 100 includes a base layer 10, a light-condensing layer 30 and a plurality of light-reflecting portions 70.

The base layer 10 includes a first surface 11 and a second surface 13 facing the first surface 11. The base layer 10 may have a thickness of a few hundred micrometers in one example. The base layer 10 may include an optical diffusion-guiding structure that is excellent in light transmittance, thermal resistance, chemical resistance, physical strength, etc. The base layer 10 includes, for example, polyethylene terephthalate (PET), polyethylene naphthalate (PEN), co-polyethylene terephthalate (co-PET), co-polyethylene naphthalate (co-PEN), and/or glass. The base layer 10 may include a polyethylene terephthalate (PET) layer, a polyethylene naphthalate (PEN) layer, a co-polyethylene terephthalate (co-PET) layer, a co-polyethylene naphthalate (co-PEN) layer, and/or a glass layer. The optical diffusion conductive structure may include polymethyl methacrylate, polyamide, polyimide, polypropylene, polyurethane, etc.

The light-condensing layer 30 is formed on the second surface 13 of the base layer 10. The light-condensing layer 30 includes a plurality of light-condensing portions 31. The light-condensing portions 31 may condense light that is incident from the first surface 11 and transmitted through the second surface 13. Here, the light-condensing represents changing a light path to be adjacent to a normal line direction of the second surface 13.

The light-condensing portions 31 may include an optical diffusion-guiding structure. In order to provide a boundary surface that refracts light, the light-condensing layer 30 may be comprised of a different material than that of the base layer 10. A refractive index of the light-condensing layer 30 may be greater than that of the base layer 10. Here, a refractive angle of light that is incident from the first surface 11 to the second surface 13 is smaller than an incident angle of the light. Thus, the light may be effectively condensed by the light-condensing portions 31.

Referring to FIGS. 1 and 2, the light-condensing portions 31 may be formed through the second surface 13 along a first direction DI1 in a first pitch P1. The first pitch P1 may have a size of a few hundred micrometers in one example. The light-condensing portions 31 are extended along the second direction DI2 perpendicular to the first direction DI1 to form a light-condensing stripe pattern. The light-condensing portions 31 meet each other, so that a plurality of grooves is formed along the second direction DI2.

A surface of the light-condensing portion 31 may have a profile that the light-condensing portion 31 performs a role of a light-condensing lens. For example, as shown in FIG. 2, when a cross-section of the light-condensing portion that is cut in parallel with the first direction DI1 is viewed, a portion corresponding to a surface of the light-condensing portion 31 may be protruded toward a normal line of the second surface.

The light-condensing layer 30 may further include a light dispersant such as a diffusion bead. The light dispersant may have an invisible size. The light dispersant may be reclaimed through the light-condensing portion 31.

The optical sheet 100 may further include a convex-concave pattern layer 50.

The convex-concave pattern layer 50 is formed on the first surface 11 of the base layer 10. The convex-concave pattern layer 50 may include an optical diffusion-guiding structure. The convex-concave pattern layer 50 may be comprised of a different material than that of the base layer 10 and/or the light-condensing layer 30. Thus, a refractive index of the convex-concave pattern layer 50 may be different from that of the base layer 10 and/or the light-condensing layer 30. The refractive index of the convex-concave pattern layer 50 may be smaller than that of the base layer 10.

The convex-concave pattern layer 50 may include a protruding portion pattern 51.

The protruding portion pattern 51 is protruded from the first surface 11 in correspondence with a plurality of grooves where the light-condensing portions 31 are formed. The protruding portion pattern 51 may provide an area where a plurality of light-reflecting portions 70 (which will be described later) will be formed.

The convex-concave pattern layer 50 may further include a light dispersant such as a light-diffusion bead.

The light-reflecting portions 70 are formed on the protruding portion pattern 51. Therefore, the light-reflecting portions 70 form a reflecting portion stripe pattern corresponding to the plurality of grooves formed by the light condensing portions 31. The light-reflecting portions 70 may define a plurality of light incident areas LA. The light incident area LA may be defined as an area corresponding to an opening exposing the first surface 11 between the light-reflecting portions 70.

Light that is incident toward the first surface 11 is incident into the base layer 10 through the convex-concave pattern layer 50 corresponding to the light incident area LA. The light that is incident into the light-reflecting portion 70 may be reflected no more than about 90% in one example.

When the optical sheet 100 is employed in a display device, a reflecting member may be disposed under the optical sheet 10. The light reflected by the light-reflecting portion 70 is again reflected by the reflecting member to be again incident into the optical sheet 100. When the above process is repeated, most of light that is incident into the optical sheet 100 may be incident into the light incident area LA.

The light-reflecting portions 70 are formed to have an increased interval distance between centers of each light-condensing portion 31 and edges of each light-reflecting portion as the light-reflecting portions 70 are moved from a center of the first surface to an edge of the first surface 11 along the first direction. That is, a width is increased toward the edge of the light-reflecting portion, which corresponds toward the edge from a center of each light-condensing portion 31 of the light incident area LA.

For example, centers of the light-reflecting portion 70 corresponding to a groove may be substantially equal to each other in a center 'C' of the first surface 11, and the light-reflecting portions 70 are separated by a uniform first line width to be formed in a second pitch P2 that is greater than the first pitch P1 along the first direction DI1 from the center of the first surface 11. A difference between the second pitch P2 and first pitch P1 may be minimized. For example, when the first pitch P1 is about 200 μm, the second pitch P2 may be about 201 μm.

Thus, the interval distance between centers of each of the light-reflecting portions 70 corresponding to the groove may be increased as the light-reflecting portions 70 are moved from a center of the first surface 11 to an edge of the first surface 11 along the first direction. An interval distance between centers of the light-reflecting portion 70 corresponding to the groove may be defined as a misalignment width. The misalignment width may be increased by a difference of the second pitch P2 and the first pitch P1 (P2−P1) between adjacent grooves.

When a viewing point is moved from a center 'C' of the first surface 11 along the first direction DI1 by 'n' light-condensing portions 31, a distance from the center may be set as 'nP1'. When a viewing point is moved from a center 'C' of the first surface 11 along the first direction DI1 by 'n' light-reflecting portions 70, a distance from the center may be set as 'nP2'. Thus, a misalignment width between a groove defined by (n)-th and (n+1)-th light-condensing portions 31 and a center of the n-th light-reflecting portion 70 may be set as 'n(P2−P1)'.

Figure 3:
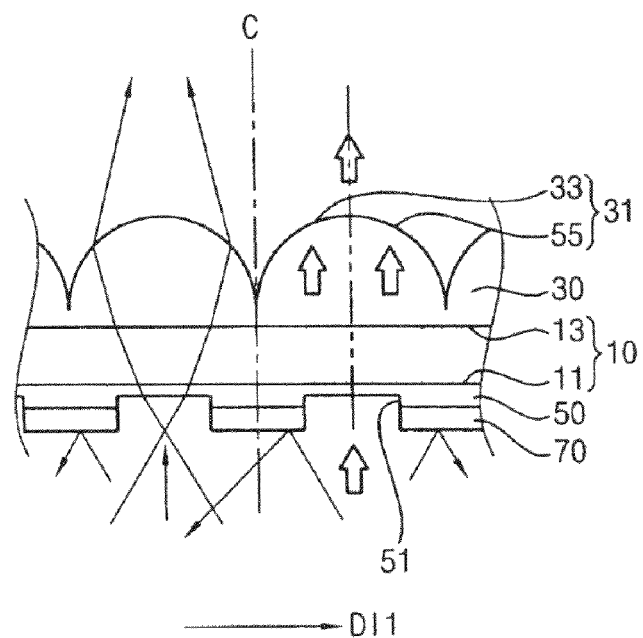
FIG. 3 is an enlarged cross-sectional view illustrating a center portion of an optical sheet of FIG. 2.
Figure 4:
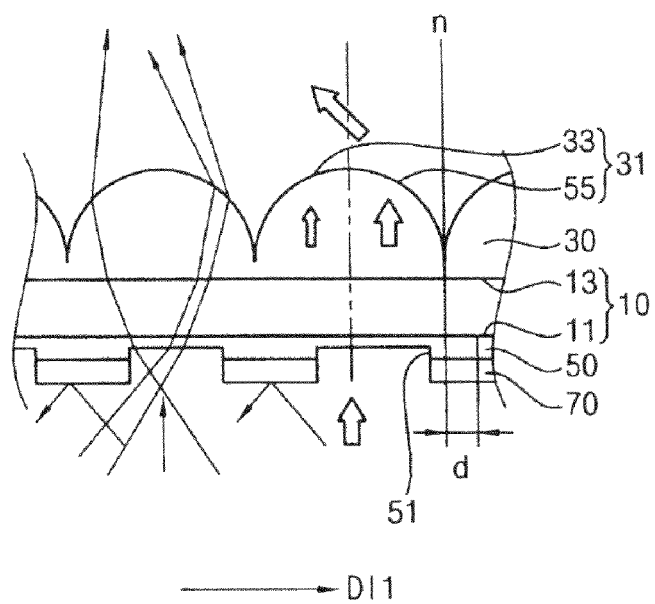
FIG. 4 is an enlarged cross-sectional view illustrating an edge portion of an optical sheet of FIG. 2.

FIG. 3 is an enlarged cross-sectional view illustrating a center portion of an optical sheet of FIG. 2. FIG. 4 is an enlarged cross-sectional view illustrating an edge portion of an optical sheet of FIG. 2.

Referring to FIGS. 3 and 4, a misalignment between a center of the light-condensing portion 31 and a center of the light incident area LA is generated similar to the misalignment between the centers of the light-reflecting portion 70 corresponding to the groove.

A center of the light incident area LA corresponds to a center of the light-condensing portion 31 at a center of the first surface 11. When a viewing point is moved toward an edge portion of the first surface 11 along the first direction DI1 by 'n' light-condensing portions 31, a distance from the center may be set as 'nP1'. When a viewing point is moved from a center of the first surface 11 along the first direction DI1 by 'n' light-reflecting portions 70, a distance from the center may be set as 'nP2'. Thus, a misalignment width between a groove defined by (n)-th and (n+1)-th light-condensing portions 31 and a center of the n-th light-reflecting portion 70 may be set as 'n(P2−P1)'.

A misalignment between the light incident area LA and the light-condensing portion 31 is not generated at a center of the first surface 11. Thus, when a uniform light is incident to the first surface 11, as shown in FIG. 3, the incident light may be uniform in a first direction DI1 with respect to a center of the light-condensing portion 31. Therefore, the light exiting from the light-condensing portion 31 may be substantially condensed with respect to the first direction DI1.

A misalignment is generated between the light incident area LA and the light-condensing portion 31 by the 'n(P2−P1)' at an edge of the first surface 11 along the first direction DI1. Thus, as shown in FIG. 4, the light may be too concentrated at a half portion of the light-condensing portion 31 in the first direction DI1 toward an edge of the first surface 11 with respect to a center of the light-condensing portion 31. Therefore, a light amount of which a path is changed toward a center of the second surface 13 of the light exiting from the light-condensing portion 31 may be greater than a light amount of which a path is changed toward an edge of the second surface 13 (represented by the larger block arrow within light-condensing portion 31).

Figure 5:
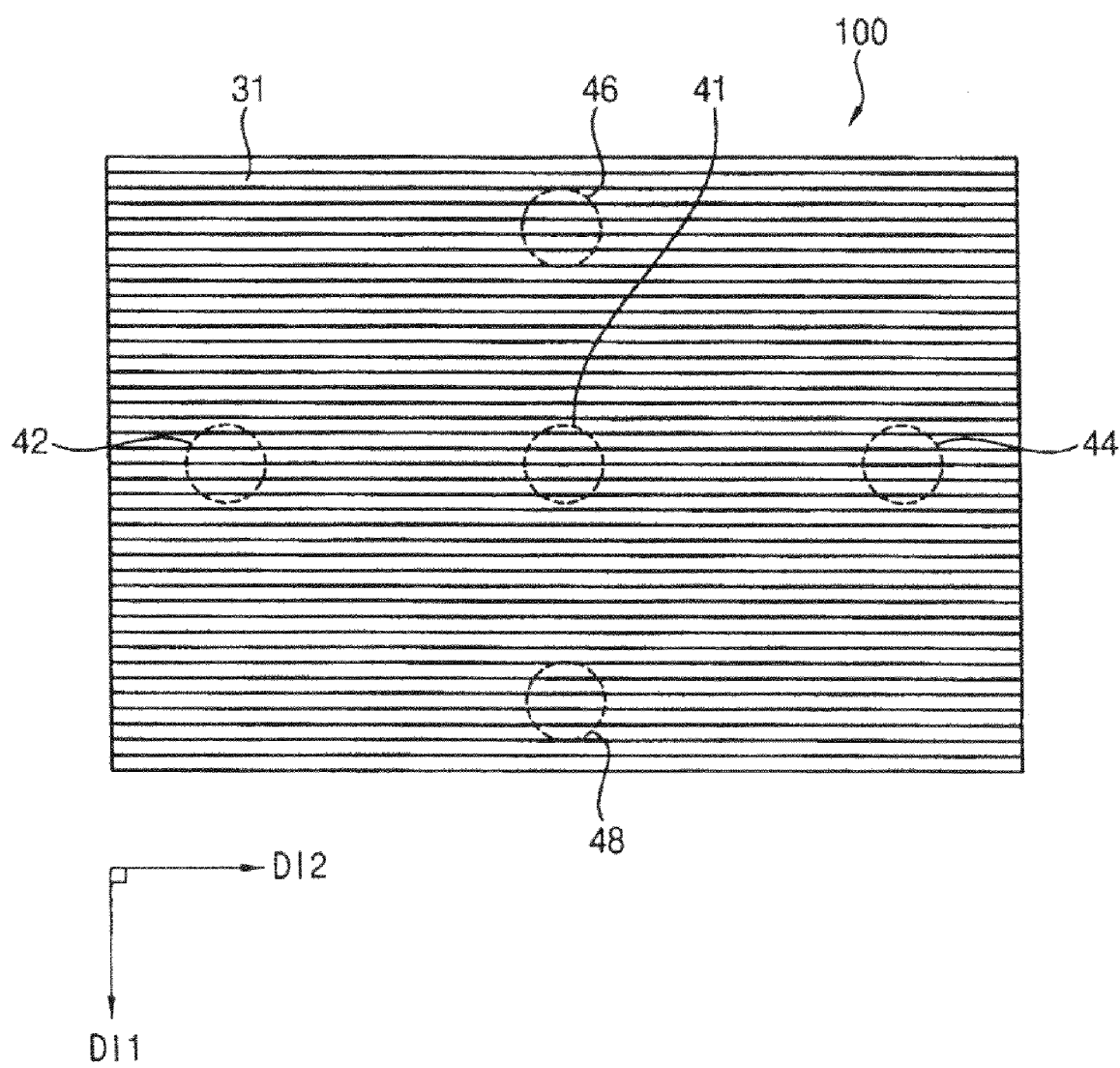
FIG. 5 is a plan view schematically illustrating an optical sheet according to a first embodiment of the present invention.
Figure 6:
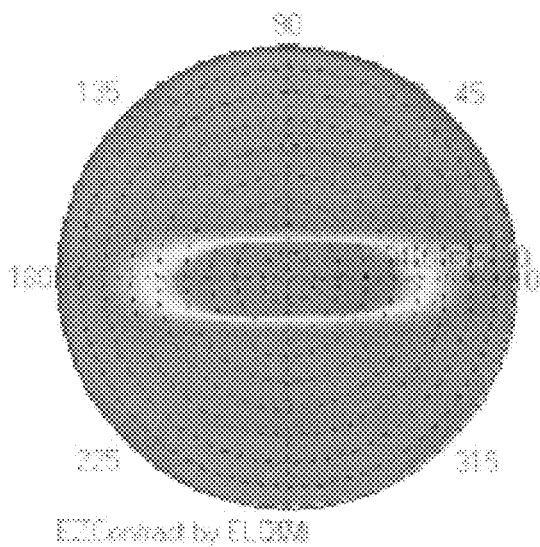
FIG. 6 is a graph showing a luminance of a center area of a second surface.

FIG. 5 is a plan view schematically illustrating an optical sheet according to a first embodiment of the present invention. FIG. 6 is a graph showing a luminance of a center area of a second surface.

Referring to FIGS. 3, 5 and 6, when exiting light exits through a center area of the second surface 13, it is recognized that the exiting light is greatly condensed with respect to the first direction DI1 (for example, from a numeric number 46 to a numeric number 48 or from a numeric number 48 to a numeric number 46), and the exiting light is widely sputtered with respect to the second direction DI2 (for example, from a numeric number 42 to a numeric number 44 or from a numeric number 44 to a numeric number 42).

Moreover, it is recognized that a luminance of the exiting light is uniform when viewed on a plane in a whole direction. Thus, it is recognized that the exiting light is uniformly condensed in the first direction DI1.

A graph for a luminance of the exiting light, which corresponds to a plurality of edge areas 42 and 44 of the second surface 13 along the second direction DI2, may be substantially identical to FIG. 6.

Figure 7:
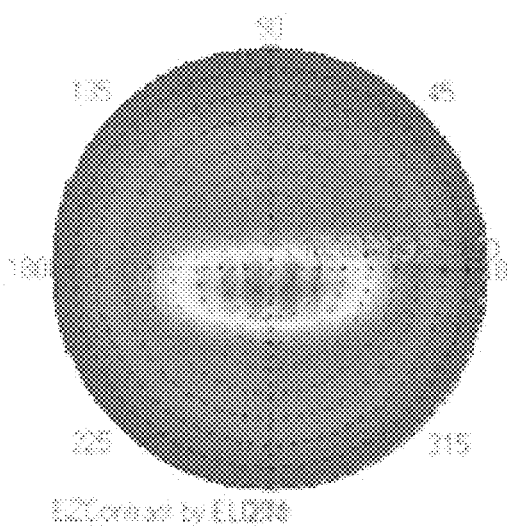
FIG. 7 is a graph showing a luminance distribution of light emitted from an upper edge area along a first direction of a second surface.
Figure 8:
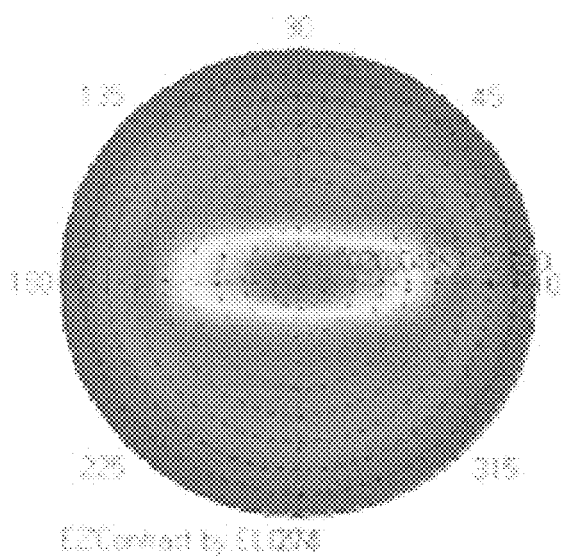
FIG. 8 is a graph showing a luminance distribution of light emitted from a lower edge area along a first direction of a second surface.

FIG. 7 is a graph showing a luminance distribution of light emitted from an upper edge area along a first direction of a second surface. FIG. 8 is a graph showing a luminance distribution of light emitted from a lower edge area along a first direction of a second surface.

Referring to FIGS. 4, 5, 7 and 8, when exiting light exits through upper edge area and lower edge area of the second surface 13, it is recognized that the exiting light is greatly condensed with respect to the first direction DI1, and the exiting light is widely sputtered with respect to the second direction DI2.

Moreover, it is recognized that a luminance of the exiting light is non-uniform according to directions with respect to the same viewing angle. In an upper edge area 46 when viewed on a plane of the optical sheet 100 as shown in FIG. 5, a luminance of the exiting light toward a center area 41 of the second surface 13 is greater than that of the exiting light toward an upper edge direction. That is, a luminance corresponding to about 270 degrees direction is greater than a luminance corresponding to about 90 degrees. In a lower edge area 48 when viewed on a plane of the optical sheet 100 as shown in FIG. 5, a luminance of the exiting light toward a center area 41 of the second surface 13 is greater than that of the exiting light toward a lower edge direction. That is, a luminance corresponding to about 90 degrees direction is greater than a luminance corresponding to about 270 degrees.

Thus, it is recognized that the exiting light is greatly condensed toward the center area 41 of the second surface 13 at the upper and lower edge areas 46 and 48 of the second surface 13.

Figure 9:
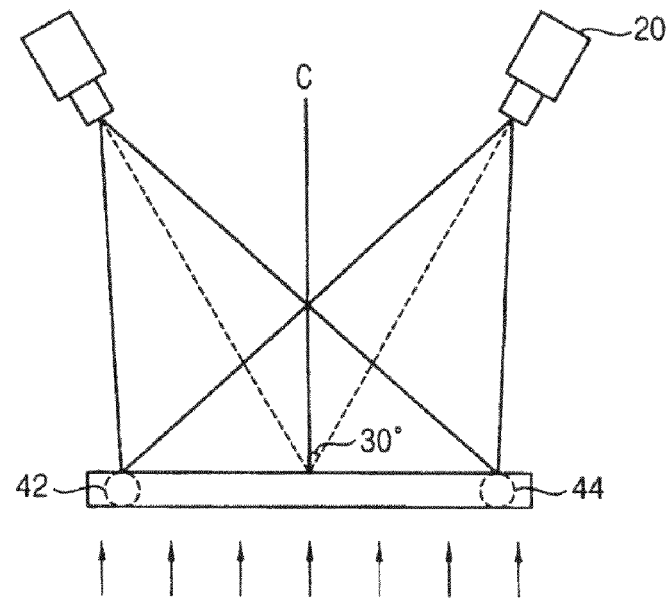
FIG. 9 is a schematic diagram illustrating luminance detection at edge areas of an optical sheet along a second direction.
Figure 10:
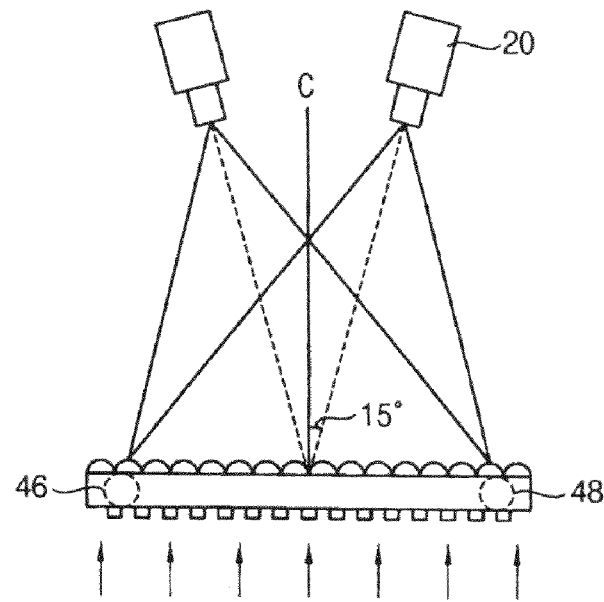
FIG. 10 is a schematic diagram illustrating luminance detection at edge areas of an optical sheet along a first direction.

FIG. 9 is a schematic diagram illustrating luminance detection at edge areas of an optical sheet along a second direction. FIG. 10 is a schematic diagram illustrating luminance detection at edge areas of an optical sheet along a first direction.

The optical sheet 100 used for a display device may be satisfied with optical characteristics that are required to the display device. The optical characteristics are that a front luminance of exiting light is greater than the required value and is satisfied with a side viewing angle condition. The side viewing angle condition may include a TCO'03 condition that is internationally used.

The TCO'03 condition may be defined as a required condition that a luminance ratio is no less than 1.7 at two edges facing each other of the optical sheet 100, when a luminance is detected from edges of the optical sheet 100 at a predetermined viewing angle as shown in FIGS. 9 and 10.

A horizontal TCO'03 value (TCO L/H) may be defined as a luminance ratio of two edges of the second direction DI2, that is no less than 1.7 when determined by a detecting device 20 directed towards a center of the optical sheet 100 in a direction of about 30 degrees with respect to a normal line of the optical sheet 100 as shown in FIG. 9.

A vertical TCO'03 value (TCO L/V) may be defined as a luminance ratio of two edges of the first direction DI1, that is no less than 1.7 when determined by a detecting device 20 directed towards a center of the optical sheet 100 in a direction of about 30 degrees with respect to a normal line of the optical sheet 100 as shown in FIG. 9.

When the horizontal TCO'03 value (TCO L/H) and the vertical TCO value (TCO L/V) exceed 1.7, an error of visibility may be generated when a user views the display panel in a horizontal direction or a vertical direction.

When a pitch of the optical reflecting portions 70 having a uniform first line width is substantially equal to that of the light-condensing portions 31, a plurality of grooves forming the light-condensing portions 31 and a center of the light-reflecting portion 70 may correspond to each other. Thus, a profile of exiting light that exits from a center of the optical sheet 100 is equal to that of exiting light that exits from an edge of the optical sheet 100. In this case, the exiting light that exits through edges of the optical sheet 100 adjacent to an exiting profile of FIG. 6 different from FIGS. 7 and 8. When a simulation for the optical sheet 100 is performed, it is recognized that the horizontal TCO'03 value (TCO L/H) and the vertical TCO'03 value (TCO L/V) exceed 1.7.

When an optical sheet 100 is employed in a display panel, a result of optical characteristics may be obtained as shown in the following Table 1. Here, the optical sheet 100 has a length of about 25 cm in a first direction DI1. A misalignment width between the light-condensing portion 31 and the light-reflecting portion 70 is no more than about 15 μm at an edge of the optical sheet 100.

TABLE 1

| Item | Luminance (Center) | Luminance (25 points average) | C/R | TCO L/V | TCO L/H |
|---|---|---|---|---|---|
| Comparative Example | 100% | 100% | 1,000 | 1.35 | 1.6 |
| Embodiment | 89% | 88% | 940 | 1.2 | 1.3 |

Referring to Table 1, the simulation of the comparative example means that a diffusion sheet, a first prism sheet and a second prism sheet crossing the first prism sheet.

When the optical sheet 100 according to the embodiment of the present invention is employed in the display panel, a front luminance is decreased about 11% to about 12% in comparison with the comparative example, and a contrast ratio is decreased about 6% in comparison with the comparative example. However, the TCO L/V value and the TCO L/H value are no less than 1.7. Thus, the conventional three optical sheets may be replaced with one optical sheet 100 according to the embodiment of the present invention.

Moreover, considering that a light transmittance of a display panel is enhanced, a decrement of the luminance and the contrast ratio may be sufficiently compensated.

Figure 11:
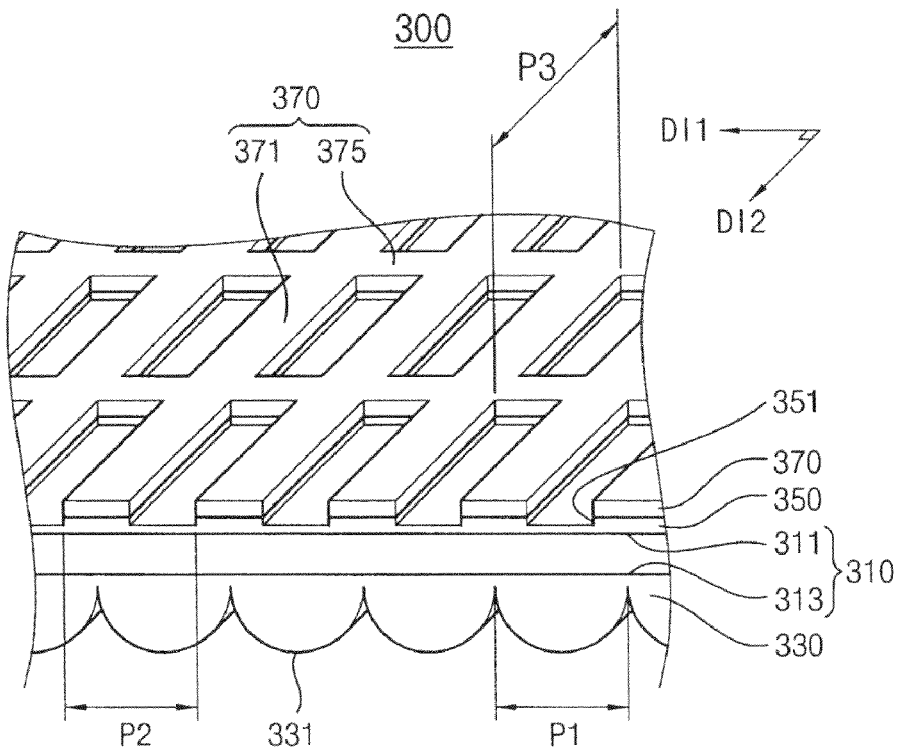
FIG. 11 is a perspective view schematically illustrating an optical sheet according to another embodiment of the present invention.

FIG. 11 is a perspective view schematically illustrating an optical sheet according to another embodiment of the present invention.

Referring to FIG. 11, an optical sheet 300 includes a base layer 310, a light-condensing layer 330, a convex-concave pattern layer 350 and a plurality of light-reflecting portions 370. The optical sheet 300 may be substantially similar to the optical sheet 100 except for the convex-concave pattern layer 350 and the light-reflecting portions 370.

The light-condensing layer 330 includes a plurality of light-condensing portions 331. The light-condensing portions 331 are formed on a second surface 313 of the base layer 310 along a first direction DI1 with a first pitch P1. The light-condensing portions 331 are extended along a second direction DI2 substantially perpendicular to the first direction DI1. The light-condensing portions 331 may form a light-condensing stripe pattern.

The convex-concave pattern layer 350 is formed on a first surface 311 of the base layer 310. The convex-concave pattern layer 350 includes a protruding portion pattern 351 which forms a lattice pattern. The protruding portion pattern 351 is formed in correspondence with a pattern which is formed by the light-reflecting portions 370. The light-reflecting portions 370 are formed on the protruding portion pattern 351.

Each of the light-reflecting portions 370 includes a first partition portion 371 and a second partition portion 375.

The first partition portion 371 corresponds to a plurality of grooves along the first direction DI1. The partition portion 371 has a second pitch P2 that is greater than the first pitch P1. A center of the first partition portion 371 corresponds to the groove at a center of the first surface 311. The second partition portion 375 is formed along the second direction DI2 with a third pitch P3. The third pitch P3 may be greater than the first pitch Pl.

As described above, as a viewing point is moved toward an edge of the first surface 311 along the first direction DI1, a misalignment width between the grooves and the first partition portion 371 may be increased. Thus, a light amount obliquely exiting through the optical sheet 300 toward a normal line of the second surface 313 may be increased. Therefore, it is possible that the vertical TCO'03 value is no more than 1.7 along the first direction DI1.

The light-condensing portions 331 are extended with a long shape along the second direction DI2. Thus, incident light toward the first surface 311 may be uniformly sputtered. Therefore, it is possible that the horizontal TCO'03 value is no more than 1.7 along the second direction DI2.

Figure 12:
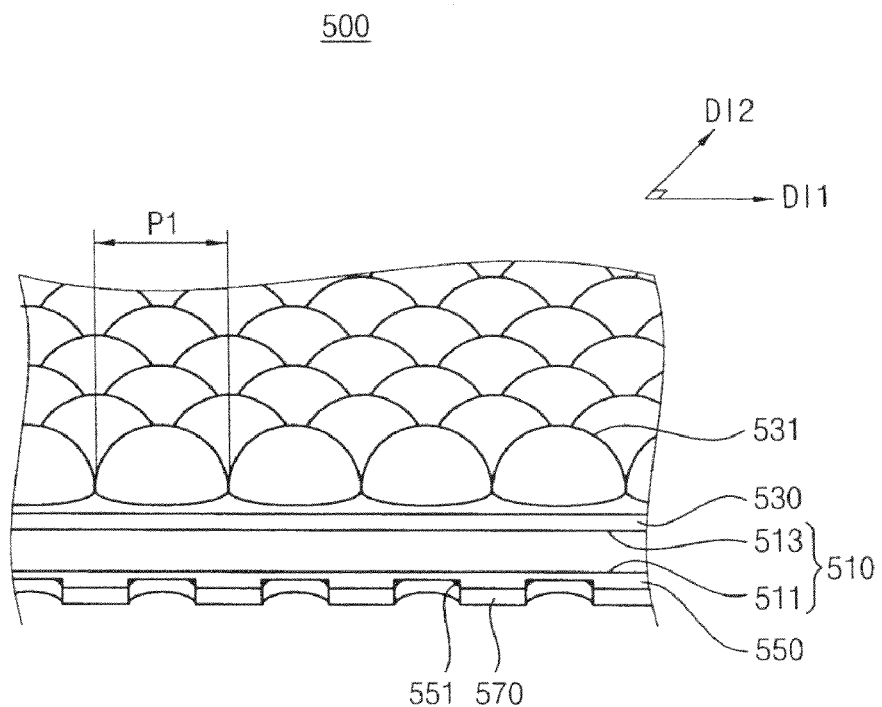
FIG. 12 is a perspective view schematically illustrating an optical sheet according to a third embodiment of the present invention.
Figure 13:
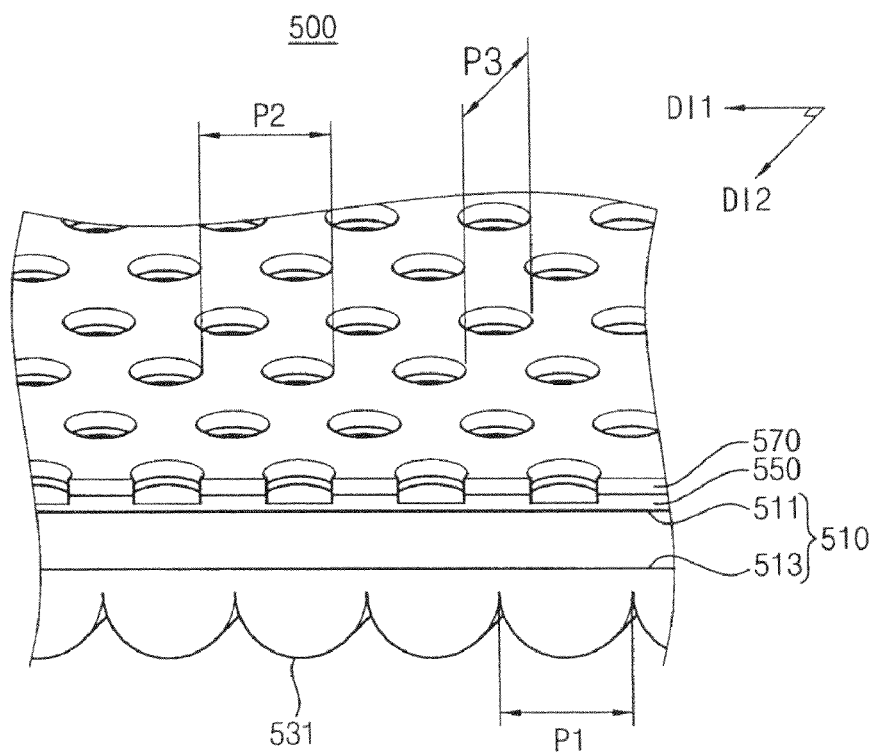
FIG. 13 is a rear perspective view schematically illustrating an optical sheet as shown in of FIG. 12.

FIG. 12 is a perspective view schematically illustrating an optical sheet according to a third embodiment of the present invention. FIG. 13 is a rear perspective view schematically illustrating an optical sheet as shown in FIG. 12.

Referring to FIGS. 12 and 13, an optical sheet 500 includes a base layer 510, a light-condensing layer 530, a convex-concave pattern layer 550 and a light-reflecting portion 570.

The base layer 510 may be substantially similar to the base layer 10 of FIG. 1.

The light-condensing layer 530 is substantially similar to the light-condensing layer 30 as shown in FIG. 1, except for a shape of the light-condensing portions 531.

In this exemplary embodiment, the light-condensing portion 531 may have a convex lens that is protruded from the second surface 513. The light-condensing portions 531 are arranged with a first pitch Pi along the first direction DI1. The light-condensing portions 531 are arranged adjacent to each other, and as a result, in one example the light-condensing portions 531 are arranged with a first pitch along the second direction DI2. Moreover, a groove that the light-condensing portions 531 form at their interface may form a lattice pattern of a matrix shape.

The convex-concave pattern layer 550 is disposed on the first surface 511. The convex-concave pattern layer 550 includes a protruding portion pattern 551 in correspondence with a plurality of grooves formed in a lattice pattern of a matrix shape.

The light-reflecting portions 570 are formed on the protruding portion pattern 551 to form a pattern corresponding to the lattice pattern of the matrix shape. One light-reflecting portion 570 may be defined in correspondence with a plurality of grooves formed by four light-condensing portions 531 adjacent to each other. A plurality of light incident areas is formed by the lattice pattern of a matrix shape forming the light-reflecting portions 570. The light incident area is surrounded by the lattice pattern of the matrix shape forming the light-reflecting portions 570, and is defined by an opening exposing the first surface 511 of the base layer 510. The light incident areas may be arranged in correspondence with a center of the light-condensing portion of a convex lens shape. The light incident area may have a circle shape but other shapes are within the scope of the invention. A width of the light incident area according to the first direction DI1 and a width of the light incident area according to the second direction DI2 may be different from each other.

In this embodiment, a crossed point of a center of the light incident area and a groove of adjacent four light-condensing portions 531 substantially corresponds to each other at a center of the first surface 511. Moreover, the light incident areas are formed with a second pitch P2 that is greater than the first pitch along the first direction DI1 from a center of the first surface 511. Moreover, the light incident areas may be formed with a third pitch P3 that is greater than the first pitch along the second direction DI2 from a center of the first surface 511. The second pitch and the third pitch may be substantially equal to each other. A pitch of the light incident area may be defined as a distance interval between the light incident areas adjacent to each other.

Therefore, when the light-condensing portion 531 is close to an edge of the first surface 511 along the first direction DI1 and the second direction DI2, a misalignment width between the center of the light-condensing portion 531 and the center of the light incident area is increased. That is, an interval distance from a center of the light-condensing portion 531 to the edge of the light-reflecting portion 570 along the first and second directions DI1 and DI2 may be increased.

Accordingly, when light is uniformly incident to the first surface, the light corresponding to an edge of the first and second directions DI1 and DI2 is condensed by the light-condensing portions 570 so that a light amount that obliquely exits toward a center of the second surface 513 may be increased. Therefore, the horizontal TCO'03 value (TCO L/H) and the vertical TCO'03 value (TCO L/V) along the first direction DI1 and the second direction DI2 may be easily designed to be no more than about 1.7.

Figure 14:
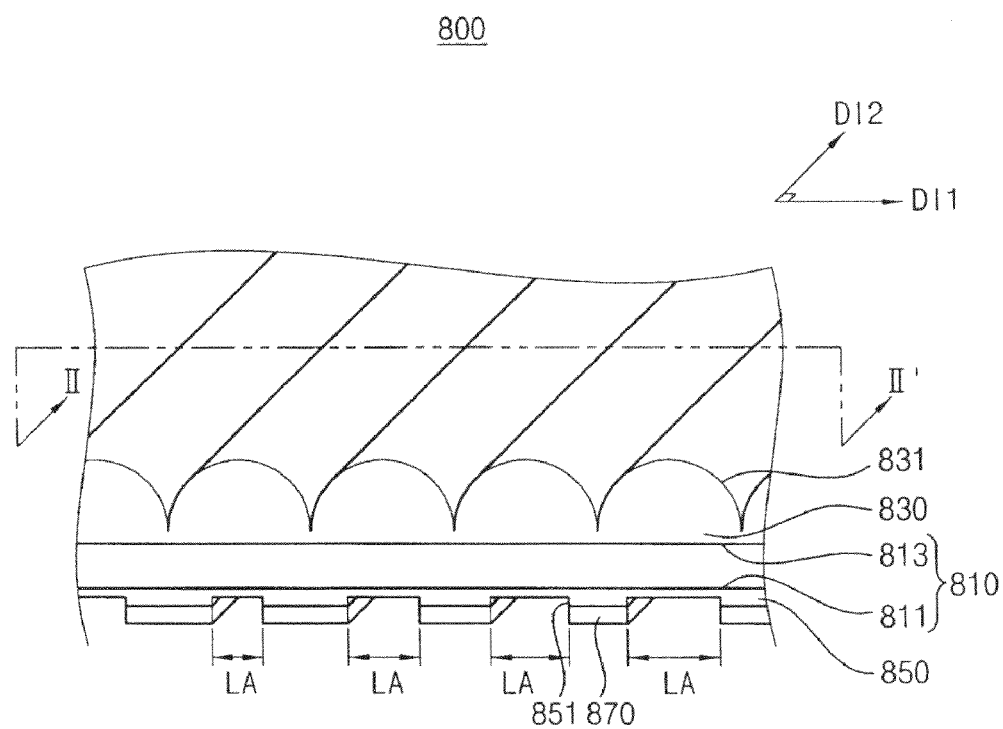
FIG. 14 is a perspective view schematically illustrating an optical sheet according to a fourth embodiment of the present invention.
Figure 15:
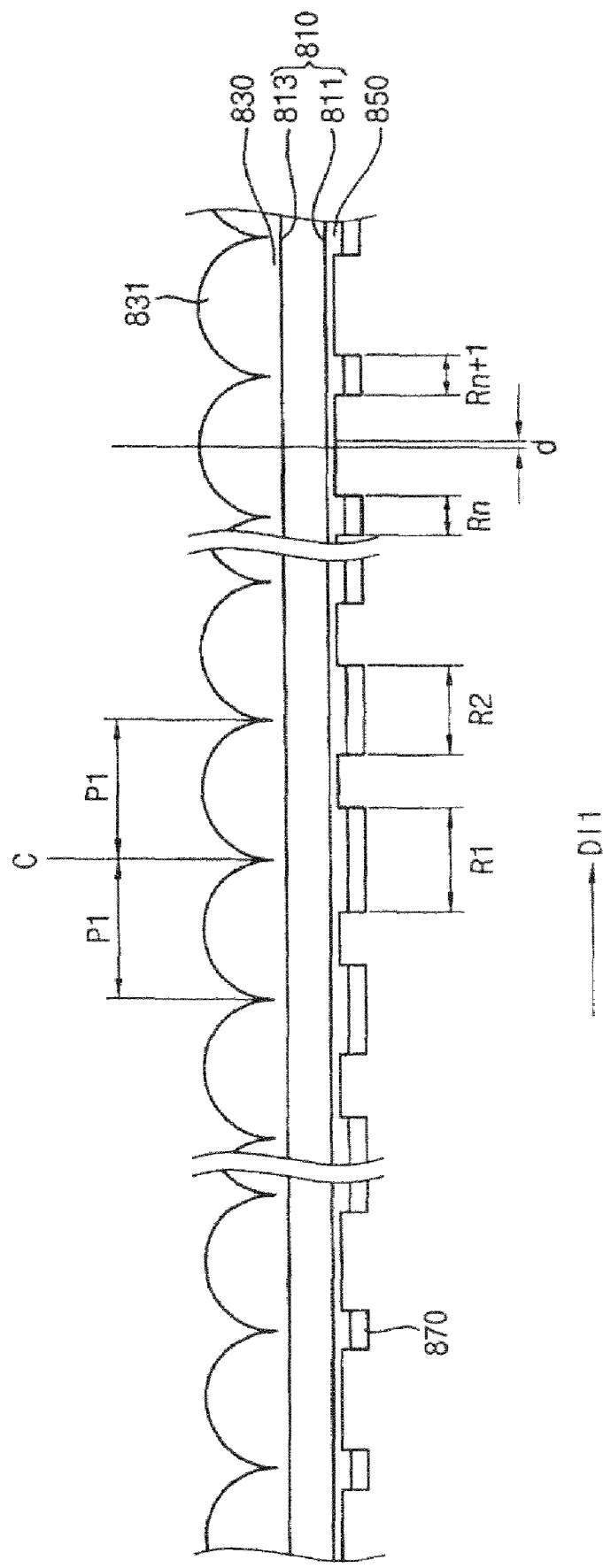
FIG. 15 is a cross-sectional view taken along a line II-II' of FIG. 14.

FIG. 14 is a perspective view schematically illustrating an optical sheet according to a fourth embodiment of the present invention. FIG. 15 is a cross-sectional view taken along a line II-II' of FIG. 14.

Referring to FIGS. 14 and 15, an optical sheet 800 is substantially similar to the optical sheet 100 as described in FIGS. 1 and 2, except for a pattern formed in the light-reflecting portions 870. Therefore, the optical sheet 800 includes a base layer 810, a light-condensing layer 830, a convex-concave pattern layer 850 and a plurality of light-reflecting portions 870.

In this embodiment, the light-reflecting portions 870 form a plurality of reflecting stripe patterns on the protruding portion pattern 851 formed on the first surface 811, and corresponds to a plurality of grooves formed by the light-condensing portions 831. The light incident area LA may be defined as an opening exposing the first surface 811 between the light-reflecting portions 870.

A first pitch P1 corresponding to the light-condensing portions 831 is uniform, and centers of each of the light-reflecting portions 870 substantially corresponds to each of the grooves formed by adjacent light-condensing portions 831. In this embodiment, as the light-reflecting portions 870 become close to an edge of the first surface 811 along the first direction DI1, a line width of the light-reflecting portions 870 may be decreased. Thus, as the light incident area becomes close to an edge of the first surface 811 along the first direction DI1 from a center of the first surface 811, a width of the light incident area LA may increase. Therefore, when light is uniformly incident to the first surface 811, as the light-condensing portions 831 become close to the edge of the first surface 811 along the first direction DI1, the light amount that is condensed toward a center of the second surface 813 may be increased by the light-condensing portions 831.

For example, when each of line widths of the light-reflecting portions is represented as R1, R2, R3, ..., Rn, R(n+1), etc., from the light-reflecting portions 870 along the first direction DI1, the relationship such as R1>R2>R3>, ...,>Rn>R(n+1), etc., may be realized. Each width of the light incident area LA may be represented as Wn=P1−0.5{R(n+1)+Rn} (wherein, 'n' is a natural number). The value of {R(n+1)+Rn} is decreased moving toward the edge along the first direction DI1, so that it is recognized that a line width of the light incident area LA may increase.

The relationship of Wn=P1−0.5{R(n+1)+Rn} represents that a width of a (n)-th light-condensing portion 831 is a first pitch P1. Here, the width of the light incident area LA is covered by the (n)-th light-condensing portion 831 by 0.5Rn, and is covered by a (n+1)-th light-reflecting portion 870 by 0.5R(n+1). Alternatively, when a value of the 0.5Rn is equal to a value of the 0.5R(n+1), that is, line widths of the light-reflecting portions 870 are equal to each other, a center of each light incident area LA may correspond to a center of each light-condensing portion 831. Different from the above, in this embodiment, a relationship of 0.5Rn>0.5R(n+1) may be realized. Thus, it is recognized that a center of the light incident area LA is spaced apart from a center of the light-condensing portion 831 by 0.5[0.5{Rn−R(n+1)}] toward the edge along the first direction DI1.

When a value of {Rn−R(n+1)} is a constant, that is, a decreasing amount of the line width of the light-reflecting portions 870 is uniform, an interval distance between a center of the light-condensing portion 831 and a center of the light incident area LA is uniform, and a width of the light incident area LA is increased moving toward the edge along the first direction DI1.

When 'n' is increased so that a value of {Rn−R(n+1)} is increased, an interval distance between a center of the light-condensing portion 831 and a center of the light incident area LA and a width of the light incident area LA are increased moving toward the edge along the first direction DI1.

Figure 16:
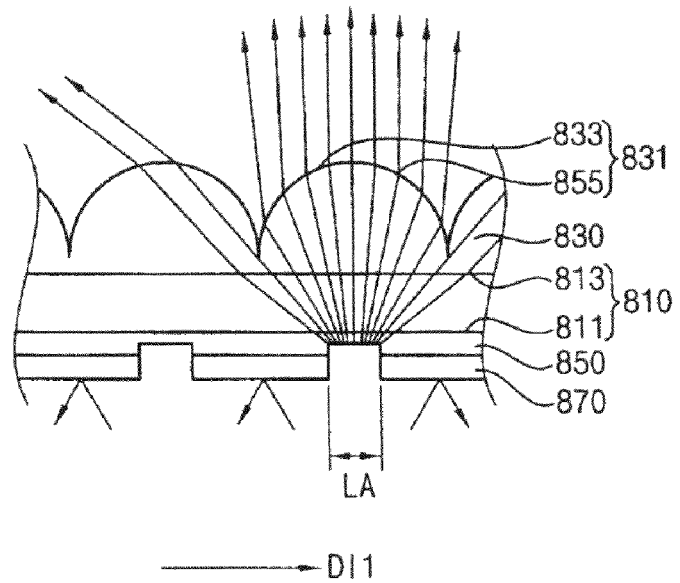
FIG. 16 is an enlarged cross-sectional view illustrating a center portion of an optical sheet of FIG. 15.
Figure 17:
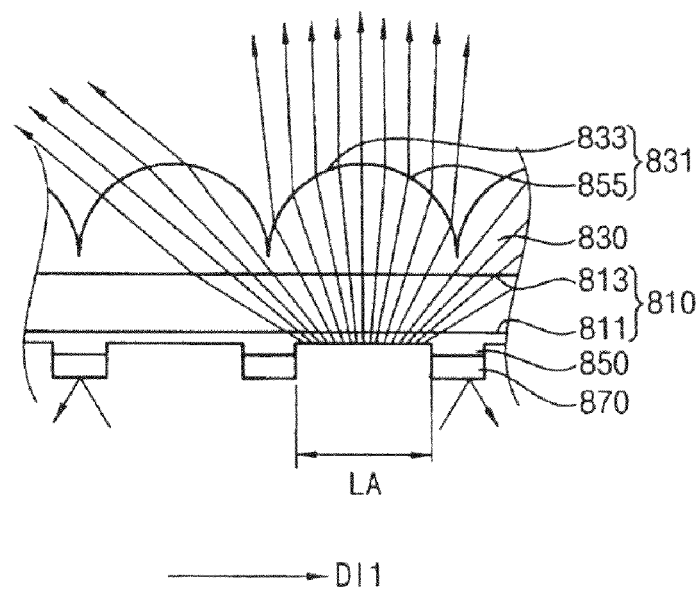
FIG. 17 is an enlarged cross-sectional view illustrating an edge portion of an optical sheet of FIG. 15.

FIG. 16 is an enlarged cross-sectional view illustrating a center portion of an optical sheet 800 of FIG. 15. FIG. 17 is an enlarged cross-sectional view illustrating an edge portion of an optical sheet 800 of FIG. 15.

Referring to FIG. 16, a center of the light incident area LA may be substantially equal to a center of the light-condensing portion 831 at a center of the first surface 811. A width of the light incident area LA may be narrower in comparison with that of the light incident area LA at an edge of the first surface 811. Thus, the light incident to the light incident area LA is condensed toward a normal line direction (which will be referred as a front direction) of the second surface, and the remaining light obliquely exits through adjacent light-condensing portions 831.

Referring to FIG. 17, a width of the light incident area LA corresponding to an edge portion of the first surface 811 is greater than that of the light incident area LA corresponding to a center portion of the first surface 811. Thus, it is recognized that an incident light amount corresponding to the edges of the light incident area LA is greater than an incident light amount corresponding to the center of the light incident area LA. However, a condensed light amount corresponding to the center is substantially equal to a condensed light amount corresponding to the edges. Thus, it is recognized that the light amount that obliquely exits through adjacent light-condensing portions 831 is greater at the edge of the first surface 811 than at the center of the first surface 811, when viewed at the same viewing angle.

Figure 18:
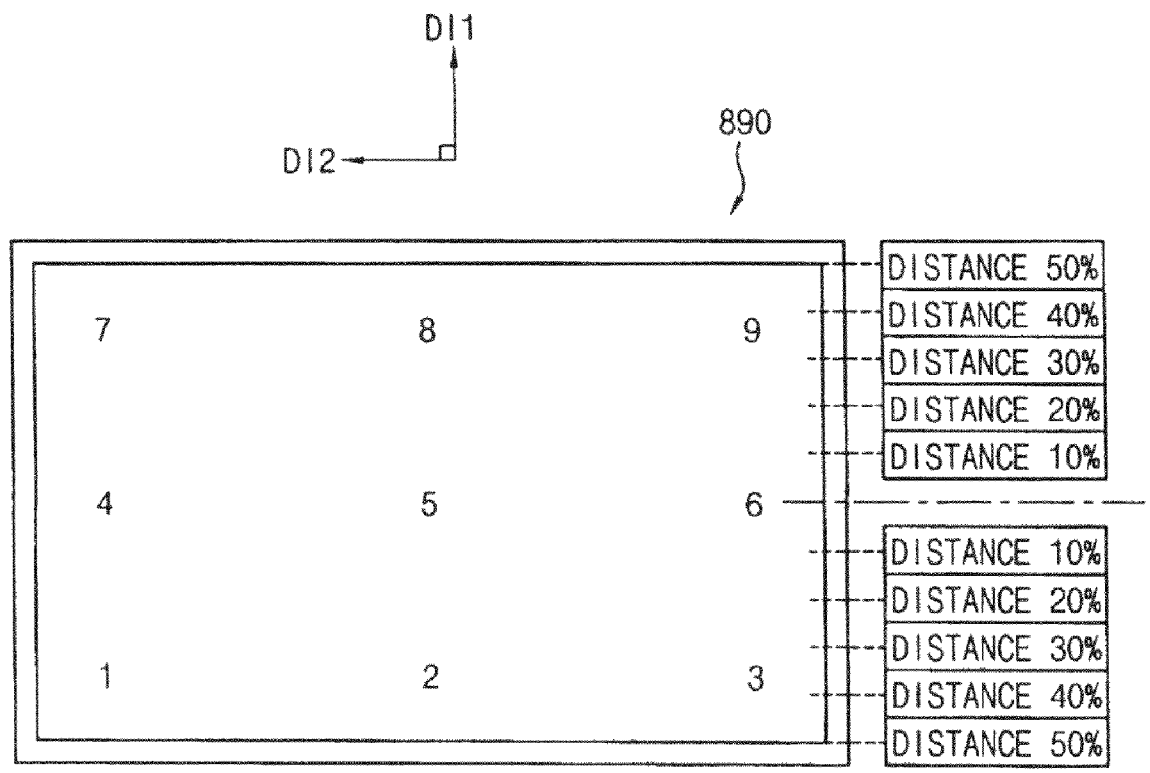
FIG. 18 is a plan view illustrating a liquid crystal display device employing an optical sheet according to embodiments of the present invention.

FIG. 18 is a plan view illustrating a liquid crystal display device employing an optical sheet 800 according to embodiments of the present invention.

Referring to FIG. 18, the TCO'03 viewing characteristics is detected at point '2,' point '4,' point '6' and point '8' of an LCD device 890, and a luminance is detected at point '5' of a center of the LCD device 890.

When a detecting device directed towards a center of a display screen of the LCD device 890 in a direction crossed with about 30 degrees with respect to a normal line of the display screen of the LCD device 890 based on a second direction DI2, a ratio of a luminance of two edge areas '4' and '6' of the second direction DI2 (i.e., a horizontal TCO'03 value (TCO L/H)) may be no more than 1.7.

When a detecting device directed towards a center of a display screen of the LCD device 890 in a direction crossed with about 15 degrees with respect to the normal line of the display screen based on a first direction DI1, a ratio of a luminance of two edge areas '2' and '8' of the first direction DI1 (i.e., a vertical TCO'03 value (TCO L/V)) may be no more than 1.7.

A width of the light-condensing portion 831, that is, a first pitch P1 defined by a distance between adjacent grooves and a width of the light incident area LA is defined as an aperture ratio. In this embodiment, the first pitch P1 of the light-condensing portions 831 is uniform, and a width of the light incident area LA may be increased moving toward the edge of the first surface 811 along the first direction DI1. Thus, an aperture ratio may increase moving toward the edge of the first surface 811 from the center of the first surface 811 along the first direction DI1.

According to the result of the simulation, in order to meet a condition that a vertical TCO'03 value (TCO L/V) is no less than 1.7, it is recognized that an aperture may satisfy the following Equation 1.

$$(0.5 \times DR + 0.3) < AR < (0.5 \times DR + 0.70)$$  Equation 1

Here, 'DR' represents a ratio of a distance between a center of a length of the optical sheet 800 and a center of the corresponsive light incident area LA, and 'AR' represents an aperture ratio.

An aperture ratio distribution requiring Equation 1 may be determined as the minimum value of an aperture ratio and the maximum value of an aperture ratio, which correspond to a distance between a center axis of the optical sheet 800 parallel with the second direction DI2 and the detecting device in the first direction DI1, as shown in the following Table 2. A difference between the minimum value and the maximum value may be a processing margin of the light-reflecting portions 870 in manufacturing of the optical sheet 800.

TABLE 2

| Minimum value of an aperture ratio [%] | Vertical distance from a center axis | Maximum value of an aperture ratio [%] |
| --- | --- | --- |
| 30 | 0 cm | 70 |
| 35 | 10 cm | 75 |
| 40 | 20 cm | 80 |
| 45 | 30 cm | 85 |
| 50 | 40 cm | 90 |
| 55 | 50 cm | 95 |

Referring to Table 2, when vertical distance from a center axis was 0 cm, about 10 cm, about 20 cm, about 30 cm, about 40 cm and about 50 cm, the minimum value of an aperture ratio was detected to be about 30%, about 35%, about 40%, about 45%, about 50% and about 55%, respectively. Moreover, when vertical distances from a center axis was 0 cm, about 10 cm, about 20 cm, about 30 cm, about 40 cm and about 50 cm, the maximum value of an aperture ratio was detected to be about 70%, about 75%, about 80%, about 85%, about 90% and about 95%, respectively.

Figure 19:
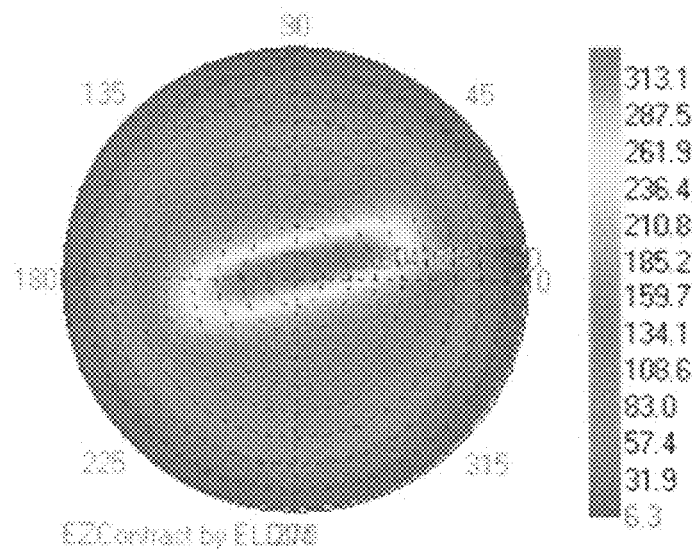
FIG. 19 is a graph showing a luminance detected at a lower edge area along a first direction in a display screen of a liquid crystal display (LCD) device employing a conventional optical sheet.
Figure 20:
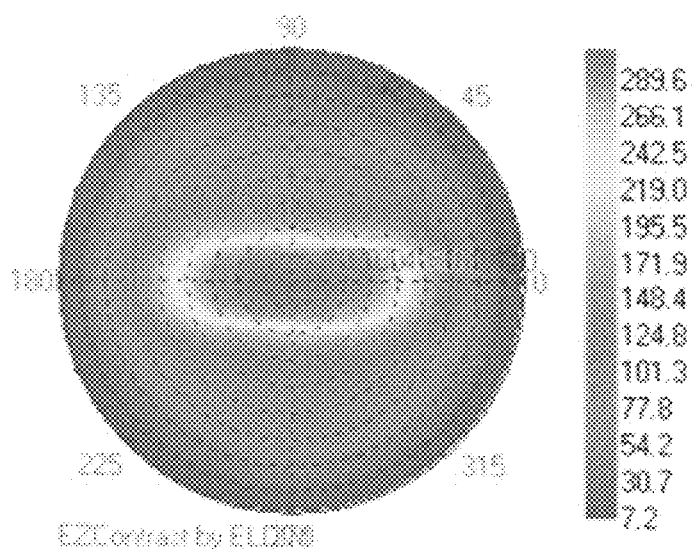
FIG. 20 is a graph showing a luminance detected at a lower edge area along a first direction in a display screen of an LCD device employing an optical sheet according to the present invention.

FIG. 19 is a graph showing a luminance detected at a lower edge area along a first direction in a display screen of an LCD device employing a conventional optical sheet. FIG. 20 is a graph showing a luminance detected at a lower edge area along a first direction in a display screen of an LCD device employing an optical sheet according to the present invention.

In the conventional multifunction optical sheet, a line width of the light-reflecting portions is uniform, and a center of the light-reflecting portion may substantially correspond to each of the grooves. Thus, a width of the light incident area LA is uniform along the first direction DI1, so that an aperture ratio of the conventional multifunction optical sheet may be uniform along the first direction DI1.

When a conventional multifunction optical sheet and the optical sheet 800 according to the present embodiment are employed in a display panel, respectively, a result of optical characteristics may be obtained as following Table 3.

TABLE 3

| Item | Luminance (Center) | Luminance (25 points average) | C/R | TCO L/V |
| --- | --- | --- | --- | --- |
| Comparative Example | 100% | 100% | 1.35 | 1.6 |
| Embodiment | 89% | 88% | 1.2 | 1.3 |

Table 3 is a measuring result when a 22-inch (i.e., 55.88 cm) wide monitor model in an LCD device 890 employing an edge type back unit is measured by a detecting device. Here, the viewing angle of the LCD device was measured by an ELDIM EZ-Contrast system, and a luminance of the LCD device was measured by a BM-7 measuring apparatus, as a luminance meter available from Topcon Corporation.

In Table 3, a center luminance and an average luminance of 25 points are substantially equal to each other at the conventional multifunction optical sheet, and a center luminance and an average luminance of 25 points are substantially equal to each other at the optical sheet 800 according to the present embodiment. That is, each front luminance of the conventional multifunction optical sheet and the optical sheet 800 of the present embodiment is substantially equal to each other, at measuring points (that is, point 2, 4, 6 and 8) as shown in FIG. 18.

Referring to FIGS. 19 and 20, it is recognized that a length of a high luminance area corresponding to the optical sheet 800 of the present embodiment is longer than that of a high luminance area corresponding to the conventional multifunction optical sheet in a horizontal direction, that is, a direction from 0 degree to 180 degrees or the second direction DI2. Thus, in a horizontal direction, a viewing angle of the conventional multifunction optical sheet is greater than that of the optical sheet of the present embodiment.

As a result, as shown in Table 3, the horizontal TCO'03 value (TCO L/H) of the conventional multifunction optical sheet is about 2.17 that is greater than 1.7; however, the horizontal TCO'03 value (TCO L/H) of the optical sheet of the present embodiment is about 1.47 that is smaller than 1.7. That is, in a side visibility, the optical sheet of the present embodiment is more enhanced than the conventional multifunction optical sheet.

A narrow viewing angle in a vertical direction (i.e., a direction from 90 degrees to 270 degrees) is measured at the conventional multifunction optical sheet (see FIG. 19). Thus, a vertical TCO'03 value (TCO L/V) of the conventional multifunction optical sheet is about 1.93 that is greater than 1.7, so that a vertical direction visibility may be inferior. However, a light amount obliquely exiting through the optical sheet 800 toward a normal line of the second surface 813 may be greatly increased moving toward the edge of the optical sheet 800 according to the present embodiment along a vertical direction (i.e., the first direction DI1). Therefore, it is possible that a viewing angle of the exiting light is greatly increased in the vertical direction as shown in FIG. 20, and the vertical TCO'03 value (TCO L/V) is about 1.42 that is smaller than 1.7.

Figure 21:
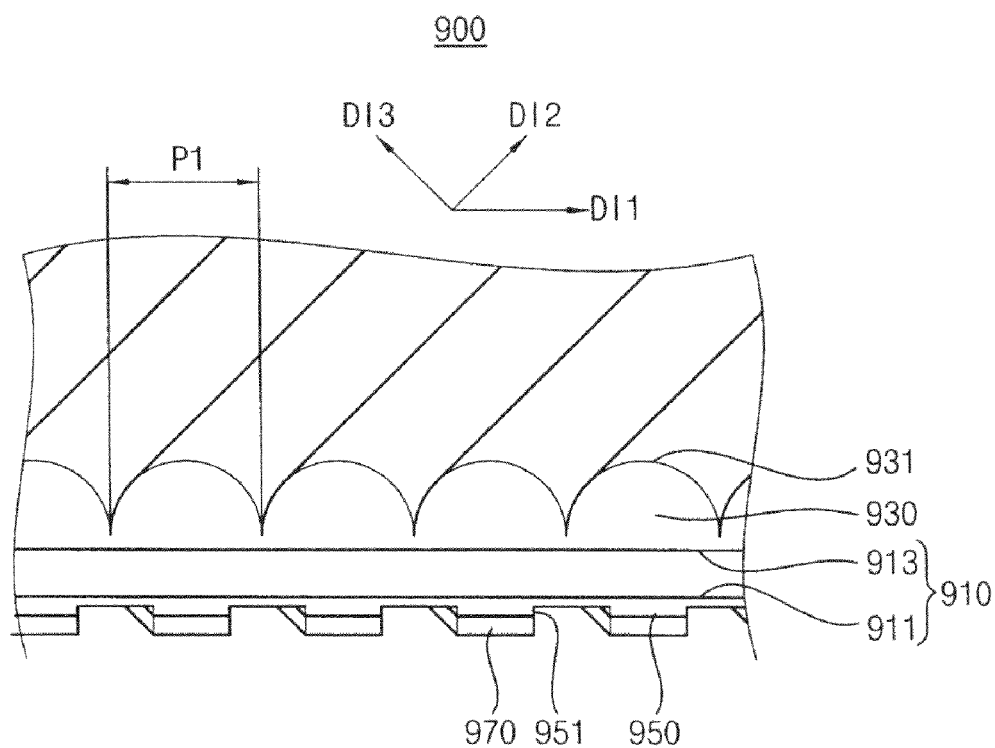
FIG. 21 is a perspective view schematically illustrating an optical sheet according to a fifth embodiment of the present invention.
Figure 22:
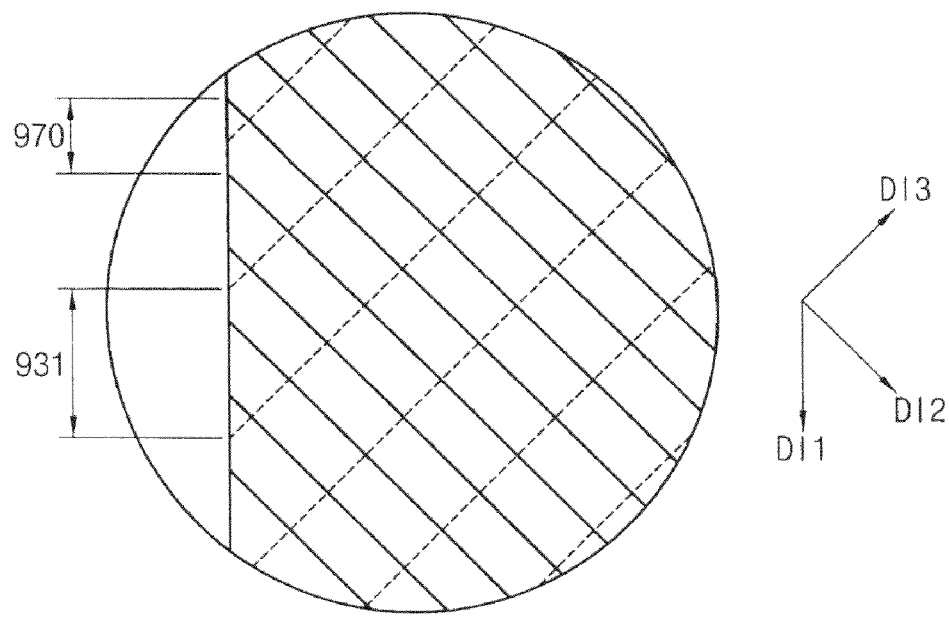
FIG. 22 is a rear perspective view schematically illustrating an optical sheet as shown in of FIG. 21.

FIG. 21 is a perspective view schematically showing an optical sheet according to a fifth embodiment of the present invention. FIG. 22 is a rear perspective view schematically showing an optical sheet as shown in of FIG. 21.

Referring to FIGS. 21 and 22, an optical sheet 900 is substantially similar to the optical sheet 100 as described in FIGS. 1 and 2 except a pattern that the light-condensing portions 931 and the light-reflecting portion 970 are arranged thereon. Thus, the optical sheet 900 includes a base layer 910, a light-condensing layer 930, a convex-concave pattern layer 950 and a plurality of light-reflecting portions 970.

In this embodiment, the light-condensing portions 931 are formed with a first pitch P1 on a second surface 913 of a base layer 910 along a first direction DI1. The light-condensing portions 931 are extended along a second direction DI2 crossing the first direction DI1 with a positive acute angle to form a light-condensing stripe pattern.

The light-reflecting portions 970 are formed on a first surface 911 of the base layer 910 The light-reflecting portions 970 are extended along a third direction DI3 crossing the second direction DI2 with a negative acute angle to form a light-condensing stripe pattern. Therefore, the light-condensing portions 931 and the light-reflecting portions 970 are crossed with each other when viewed on a plane.

For example, an edge portion of the light-condensing portions 931 along the third direction DI3 and an edge portion of the light-reflecting portion 970 along the second direction DI2 may be met. Each center of the light-reflecting portions 970 may substantially correspond to each of the grooves which are formed by the adjacent light-condensing portions 931 at the edge portions. In this embodiment, a line width of the light-reflecting portions 970 may be decreased moving toward the edge of the first surface 911 from a center of the first surface 911 along the first direction DI1. Thus, one of the light-condensing portions 931 is extended in a third direction DI3, and the extended light-condensing portion 931 may cross with the light incident area LA having a width increased moving toward the edge.

In this embodiment, the light-condensing portions 931 may be extended toward a diagonal line of a display screen, for example, a direction along points 1 and 9 as shown in FIG. 18. The light-reflecting portions 970 may be extended toward a diagonal line of the display screen, for example, a direction along points 3 and 7 as shown in FIG. 18. Therefore, in the optical sheet 900, the horizontal TCO'03 value (TCO L/H) and the vertical TCO'03 value (TCO L/V) are no more than 1.7, respectively, and a viewing angle is large in the 1 and 9 points direction and the 3 and 7 points direction.

Display Device

Figure 23:
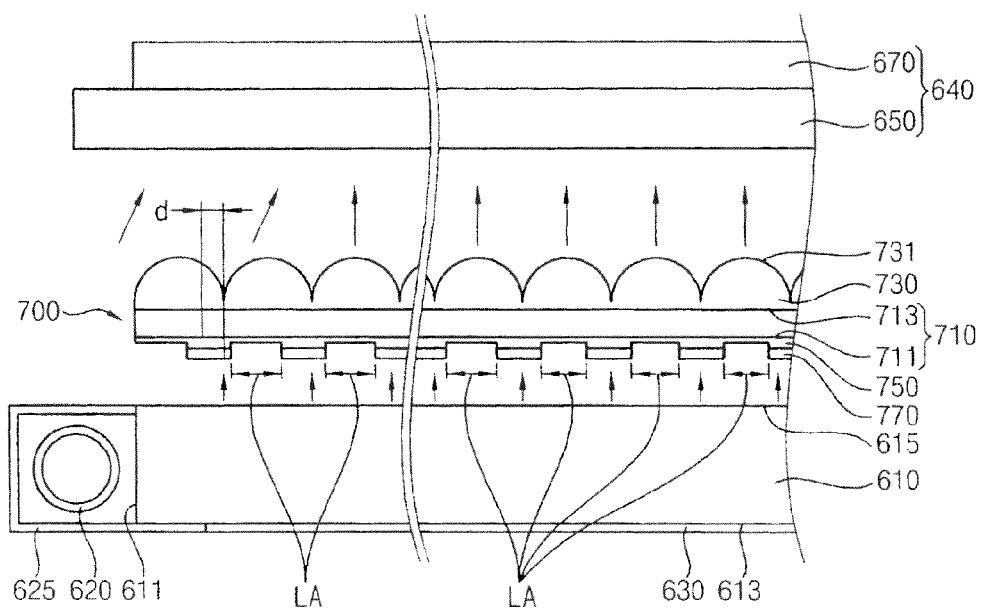
FIG. 23 is a cross-sectional view illustrating a display device according to one embodiment of the present invention.

FIG. 23 is a cross-sectional view showing a display device according to one embodiment of the present invention.

Referring to FIG. 23, a display device includes a light-guide plate (LGP) 610, a light source 620, an optical sheet 700 and a display panel 640.

The LGP 610 includes a light-exiting surface 615 and a light-reflecting surface 613 that are opposite to each other, and a plurality of side surfaces 611 that connect the light-exiting surface 615 and the light-reflecting surface 613.

The LGP 610 may include the optical diffusion-guiding structure.

The light source 620 may include a line light source 620 such as a cold cathode fluorescent lamps (CCFL). Alternatively, the light source 620 may include a point light source such as a light-emitting diode (LED). The line light source 620 may be disposed adjacent at least one of the side surfaces 611. The line light source 620 may also be disposed at two side surfaces 611 that are opposite to each other.

The display device may further include a lamp reflector 625. The lamp reflector 625 surrounds the line light surface 620 to provide light to the side surface 611 by reflecting the light emitted from the line light source 620. The provided light is repeatedly reflected at the side surfaces 611 and the reflecting surface 613 of the LGP 610, and the light exits through the light-exiting surface 615 when an exiting condition is required.

A plurality of optical patterns such as a plurality of dot patterns may be formed in the light-reflecting surface 613 to reflect and diffuse light. Thus, light exiting from the line light source 620 may be converted into a surface light shape.

The display device may further include a reflecting sheet 630 that is disposed in the light-reflecting surface 613 to again reflect incident leakage light into the light-reflecting surface 613.

The optical sheet 700 is disposed on the light-exiting surface 615 of the LGP 610. In this exemplary embodiment, the optical sheet is substantially the same as the optical sheet 100 as described in FIGS. 1 to 10. Alternatively, the optical sheet 700 may be capable of replacing the optical sheets 300, 500, 800 and 900 as described in FIGS. 11, 12, 14 and 21. Thus, the optical sheet 700 includes a base layer 710, a light-condensing layer 730, a convex-concave pattern layer 750 and a plurality of light-reflecting portions 770.

A first surface 711 of the base layer 710 faces the light-exiting surface 615. The light-condensing portions 731 are extended toward a length direction (i.e., a second direction) of the line light source 620 on a second surface 713 to form a light-condensing stripe pattern. The light-condensing portions 731 are formed in a first direction perpendicular to a second direction with a first pitch P1.

The light-reflecting portions 770 are formed in a first surface 711 in correspondence with a plurality of grooves forming the light-condensing portions 731. A center of a width of the light-reflecting portion 770 corresponds to the grooves at a center of the first surface 711. The light-reflecting portions 770 have a second pitch P2 that is greater than the first pitch P1 along the first direction. Thus, a misalignment width between the groove and the center of the light-reflecting portion 770 is increased moving toward the edge of the first surface, that is, a first side surface 611 where the line light source 620 is disposed or a second side surface opposite to the first side surface 611.

The display panel 640 is disposed on the optical sheet 700 to display an image based on the exiting light from the light-condensing layer 730. The display panel 640 includes a lower substrate 650, an upper substrate 670 and a liquid crystal layer therebetween.

The lower substrate 650 includes a plurality of pixels arranged in a matrix shape. The upper substrate 670 is opposite to the lower substrate 650. The upper substrate 670 includes a common electrode facing the pixels. The liquid crystal layer is interposed between the lower substrate 650 and the upper substrate 670.

A light incident area LA between the light-reflecting portions 770 of the optical sheet 700 may be too concentrated at the side surface 611 of the LGP 610 or an opposite surface of the side surface 611 with respect to a center of the light-condensing portion 731 as the light-reflecting portion 770 becomes close to the side surface 611 of the LGP 610 or the opposite surface. As a result, light exits in a slant with respect to a normal line of the second surface, so that light components may be increased toward a center portion of the optical sheet 700.

Thus, when the display panel 640 is observed with increasing a viewing angle along a vertical direction (i.e., the first direction), a light amount toward a center of the optical sheet 700 from edges of the optical sheet 700 is increased moving to the edges. Thus, when the display panel 640 is observed at a viewing angle of about 15 degrees along the first direction, a vertical TCO'03 value (TCO L/V) is no more than 1.7.

Regarding the second direction, the light is diffused in a length of the light-condensing portion 731. Thus, when the display panel 640 is observed at a viewing angle of about 30 degrees along the second direction, a horizontal TCO'03 value (TCO L/H) is no more than 1.7.

An arrangement direction of the pixel and an arrangement direction may be in parallel with each other. In another embodiment, the light-condensing portions 731 and the light-reflecting portions 770 may be crossed with an arrangement pattern of the pixels of the display panel 640.

For example, when the display device employs the optical sheet 700 as shown in FIG. 21, the light-condensing stripe pattern formed by the light-condensing portions 731 may be extended along a direction crossing the first direction with a positive acute angle, and the reflecting stripe pattern formed by the light-reflecting portions 770 may be extended along a direction crossing the first direction with a negative acute angle. The pixels may be disposed with a matrix pattern in a horizontal direction (i.e., the second direction) and a vertical direction (i.e., the first direction).

Therefore, each of the light-condensing stripe pattern and the reflecting stripe pattern may be crossed with an arrangement pattern of the pixels in an acute angle. As a result, a moiré phenomenon may be prevented, in which a dot pattern of the LGP 610 is displayed on the display panel 640.

In this embodiment, one optical sheet 700 is disposed between the LGP 610 and the display panel 640 to enhance optical characteristics of light exiting from the light-exiting surface 615 of the LGP 610. The optical sheet 700 enhances optical characteristics such as luminance uniformity, a front luminance, a contrast ratio, and a side visibility of light exiting from the light-exiting surface 615 to provide a display panel with the enhanced light. In another embodiment, the display device may include a protective sheet that protects the light-condensing portions 731.

According to the optical sheet and the display device having the optical sheet, the display device includes one optical sheet according to the present invention, so that optical sheets such as a plurality of diffusion sheets and a plurality of prism sheets may be omitted. The optical sheet according to the present invention is disposed on an LGP to enhance optical characteristics of light exiting from the LGP. The optical sheet may satisfy viewing angle characteristics such as front luminance and contrast ratio characteristics, and horizontal TCO'03 and vertical TCO'03 conditions.

Therefore, display quality may not be deteriorated, and the number of the optical sheets that are used for the display device may be reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An optical sheet, comprising:
    a base layer including a first surface and a second surface facing the first surface;
    a light-condensing layer including a plurality of light-condensing portions with a first pitch, the light-condensing portions formed along a first direction of the second surface; and
    a plurality of light-reflecting portions formed on the first surface and spaced apart from each other along the first direction in correspondence with a plurality of grooves, each groove formed between two light-condensing portions, an interval distance between a center of the light-condensing portion and an edge of the light-reflecting portion increasing when moving toward an edge of the first surface from a center of the first surface along the first direction,
    wherein the light-condensing portions are extended along a second direction crossing the first direction with a positive acute angle to form a light-condensing stripe pattern,
    wherein the light-reflecting portions are extended along a third direction crossing the second direction with a negative acute angle to form a light-reflecting stripe pattern, and
    wherein each center of the light-reflecting portions substantially corresponds to each of the grooves which are formed by adjacent light-condensing portions at an edge.

2. The optical sheet of claim 1, wherein the light-reflecting portions have a uniform first line width formed in a second pitch that is greater than the first pitch along the first direction from the center of the base layer.

3. The optical sheet of claim 2, wherein the light-condensing portions are extended along a second direction perpendicular to the first direction to form a light-condensing stripe pattern, and a cross-section of the light-condensing portions, which is cut in parallel with the first direction, is protruded toward a normal line of the second surface.

4. The optical sheet of claim 3, wherein the light-reflecting portions are extended along the grooves that are formed in parallel with the second direction to form a light-reflecting stripe pattern.

5. The optical sheet of claim 3, wherein each of the light-reflecting portions comprises:
    a first partition part having the first line width, the first partition part being formed along the first direction from the center with the second pitch; and
    a second partition part having a second line width, the second partition part being formed along the second direction from the center with a third pitch, wherein the first and second partition parts define a matrix shape.

6. The optical sheet of claim 1, wherein each of the light-condensing portions has a convex lens shape that is protruded from the second surface and is arranged along a second direction perpendicular to the first direction with the first pitch.

7. The optical sheet of claim 6, wherein the light-reflecting portions form a lattice pattern of a matrix shape in correspondence with the grooves formed between the light-condensing portions, and
    the light incident area, surrounded by the lattice pattern of the matrix shape and formed by an opening exposing the first surface, is arranged with a second pitch that is greater than the first pitch along the first direction, and is formed with a third pitch that is greater than the first pitch along the second direction.

8. The optical sheet of claim 1, wherein the light-condensing portions are extended along a second direction perpendicular to the first direction to form a light-condensing stripe pattern,
a center of the light-reflecting portion is disposed in the groove parallel with the second direction to form a reflecting stripe pattern, and
a line width of the light-reflecting portion is decreasing when moving toward the edge of the optical sheet from the center of the optical sheet along the first direction.

9. The optical sheet of claim 8, wherein an aperture ratio is defined by a ratio of width of the light incident area to a first pitch defined by a distance between adjacent grooves and satisfies the equation of (0.5×DR+0.3)<AR<(0.5×DR+0.70), wherein 'DR' represents a ratio of a distance between a center of a length of the optical sheet and a center of the corresponsive light incident area, and 'AR' represents an aperture ratio.

10. The optical sheet of claim 1, further comprising a convex-concave pattern layer disposed between the first surface and the light-reflecting portion to have a protruding portion pattern having the light-reflecting portions formed thereon.

11. The optical sheet of claim 10, wherein at least one of the light-condensing layer and the convex-concave pattern layer comprises a light dispersant.

12. An optical sheet, comprising:
a base layer including a first surface and a second surface facing the first surface;
a light-condensing layer including a plurality of light-condensing portions with a first pitch, the light-condensing portions formed along a first direction of the second surface; and
a plurality of light-reflecting portions formed on the first surface and spaced apart from each other along the first direction in correspondence with a plurality of grooves, each groove formed between two light-condensing portions,
each center of the plurality of light-reflecting portions substantially corresponding to one of the plurality of grooves, and each distance between a groove and a corresponding center of the light-reflecting portion increasing when moving toward an edge of the first surface along the first direction,
wherein the light-condensing portions are extended along a second direction crossing the first direction with a positive acute angle to form a light-condensing stripe pattern,
wherein the light-reflecting portions are extended along a third direction crossing the second direction with a negative acute angle to form a light-reflecting stripe pattern, and
wherein each center of the light-reflecting portions substantially corresponds to each of the grooves which are formed by adjacent light-condensing portions at an edge.

13. An optical sheet, comprising:
a base layer including a first surface and a second surface facing the first surface;
a light-condensing layer including a plurality of light-condensing portions with a first pitch, the light-condensing portions formed along a first direction of the second surface; and
a plurality of light-reflecting portions formed on the first surface and spaced apart from each other along the first direction in correspondence with a plurality of grooves, each groove formed between two light-condensing portions,
each center of the plurality of light-reflecting portions substantially corresponding to one of the plurality of grooves, and each line width of the light-reflecting portions decreasing when moving toward an edge of the first surface along the first direction,
wherein the light-condensing portions are extended along a second direction crossing the first direction with a positive acute angle to form a light-condensing stripe pattern,
wherein the light-reflecting portions are extended along a third direction crossing the second direction with a negative acute angle to form a light-reflecting stripe pattern, and
wherein each center of the light-reflecting portions substantially corresponds to each of the grooves which are formed by adjacent light-condensing portions at an edge.

14. A display device, comprising:
a light-guide plate (LGP) comprising a light-exiting surface, a light-reflecting surface opposite to the light-exiting surface, and a plurality of side surfaces connected to the light-exiting surface and the light-reflecting surface;
a light source adjacent at least one of the side surfaces to provide the side surface with light;
an optical sheet comprising:
a base layer including a first surface facing the light-exiting surface and a second surface opposite to the first surface;
a light-condensing layer including a plurality of light-condensing portions formed on the second surface with a first pitch, the light-condensing portions formed along a first direction of the second surface; and
a plurality of light-reflecting portions formed on the first surface and spaced apart from each other along the first direction in correspondence with a plurality of grooves, each groove formed between two light-condensing portions, wherein an interval distance between a center of the light condensing portion and an edge of the light-reflecting portion increases when moving toward one of the side surfaces; and
a display panel disposed on the optical sheet to display an image based on the light exiting through the light-condensing layer,
wherein the light-condensing portions are extended along a second direction crossing the first direction with a positive acute angle to form a light-condensing stripe pattern,
wherein the light-reflecting portions are extended along a third direction crossing the second direction with a negative acute angle to form a light-reflecting stripe pattern, and
wherein each center of the light-reflecting portions substantially corresponds to each of the grooves which are formed by adjacent light-condensing portions at an edge.

15. The display device of claim 14, wherein the light-reflecting portions have a uniform first line width formed in a second pitch that is greater than the first pitch along the first direction from the center of the base layer.

16. The display device of claim 14, wherein each center of the light-reflecting portions substantially corresponds to each of the grooves, and each line width of the light-reflecting portions decreases when moving toward the side surface along the first direction.

17. The display device of claim 14, wherein the light-condensing stripe pattern and the light-reflecting stripe pattern are crossed with an arrangement pattern of pixels of the display panel to prevent a moiré phenomenon from occurring on the display panel.

18. The display device of claim 14, wherein the optical sheet is disposed between the LGP and the display panel to enhance luminance uniformity and a front luminance of light exiting through the light-exiting surface.

19. The display device of claim 18, further comprising a plurality of light-diffusion patterns formed on the light-reflecting surface, the light-diffusion patterns reflecting and diffusing a portion of light incident through the side surface.

* * * * *